United States Patent
Agarwal et al.

(10) Patent No.: US 10,607,223 B2
(45) Date of Patent: Mar. 31, 2020

(54) UTILIZING PHRASE TOKENS IN TRANSACTIONS

(71) Applicant: Amazon Technologies, Inc., Reno, NV (US)

(72) Inventors: Amit D. Agarwal, Mercer Island, WA (US); Michael M. George, Mercer Island, WA (US); Ian W. Freed, Seattle, WA (US); Jeffrey P. Bezos, Greater Seattle, WA (US); Peter S. Vosshall, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 773 days.

(21) Appl. No.: 13/829,435

(22) Filed: Mar. 14, 2013

(65) Prior Publication Data
US 2013/0204790 A1 Aug. 8, 2013

Related U.S. Application Data

(62) Division of application No. 11/548,111, filed on Oct. 10, 2006.
(Continued)

(51) Int. Cl.
*G06Q 20/40* (2012.01)
*G06F 17/27* (2006.01)
(Continued)

(52) U.S. Cl.
CPC ....... *G06Q 20/4014* (2013.01); *G06F 17/227* (2013.01); *G06F 17/277* (2013.01);
(Continued)

(58) Field of Classification Search
CPC ............. G06Q 20/3821; G06Q 20/401; G06Q 20/4014
See application file for complete search history.

(56) References Cited

U.S. PATENT DOCUMENTS 5,953,710 A 9/1999 Fleming
6,047,268 A 4/2000 Bartoli et al.
(Continued)

FOREIGN PATENT DOCUMENTS

EP 1077436 A2 2/2001
EP 1504393 A2 2/2002
(Continued)

OTHER PUBLICATIONS

Notice from the European Patent Office, Official Journal of the European Patent Office dated Oct. 1, 2007, vol. 30, Issue 11, pp. 592-593.

*Primary Examiner* — Jay Huang
(74) *Attorney, Agent, or Firm* — Knobbe, Martens, Olson & Bear, LLP

(57) ABSTRACT

A system and method for facilitating transactions utilizing phrase tokens are provided. Individual entities can be associated with unambiguous transaction phrase tokens, such as multiple word phrases. The transaction phrase tokens are associated with transaction accounts by a service provider such that the entities can complete a transaction without having to exchange transaction account information. In a transaction, a transaction phrase token is offered to an accepting party, which tenders the offered transaction phrase token to the service provider. The service provider processes the offered transaction phrase token according to configuration information specified for the transaction phrase token. The service provider can automatically process the transaction request or request additional information.

29 Claims, 13 Drawing Sheets

Related U.S. Application Data

(60) Provisional application No. 60/823,611, filed on Aug. 25, 2006.

(51) Int. Cl.

| | | |
|---|---|---|
| *G06Q 20/10* | (2012.01) | |
| *G07F 7/10* | (2006.01) | |
| *G10L 15/00* | (2013.01) | |
| *G06Q 20/38* | (2012.01) | |
| *G06F 17/22* | (2006.01) | |
| *G06Q 30/00* | (2012.01) | |
| *G06Q 30/06* | (2012.01) | |

(52) U.S. Cl.
CPC ............ *G06Q 20/10* (2013.01); *G06Q 20/38* (2013.01); *G06Q 20/3821* (2013.01); *G06Q 20/40* (2013.01); *G06Q 20/40145* (2013.01); *G07F 7/1075* (2013.01); *G10L 15/00* (2013.01); *G06Q 30/00* (2013.01); *G06Q 30/0603* (2013.01)

(56) References Cited

U.S. PATENT DOCUMENTS

| | | | |
|---|---|---|---|
| 6,332,131 B1 | 12/2001 | Grandcolas | |
| 6,640,304 B2 | 10/2003 | Ginter | |
| 6,658,568 B1 | 12/2003 | Ginter et al. | |
| 6,853,987 B1 | 2/2005 | Cook | |
| 6,988,657 B1 | 1/2006 | Singer et al. | |
| 7,076,652 B2 | 7/2006 | Ginter et al. | |
| 7,136,841 B2 | 11/2006 | Cook | |
| 7,512,567 B2 | 3/2009 | Bemmel | |
| 7,784,684 B2 | 8/2010 | Labrou | |
| 8,170,954 B2 | 5/2012 | Keresman, III | |
| 2002/0046169 A1 | 4/2002 | Keresman, III et al. | |
| 2002/0112171 A1 | 8/2002 | Ginter et al. | |
| 2002/0123973 A1 | 9/2002 | Eccles et al. | |
| 2002/0133347 A1* | 9/2002 | Schoneburg ............ G06F 17/27 704/257 |
| 2003/0061170 A1 | 3/2003 | Uzo | |
| 2003/0088784 A1 | 5/2003 | Ginter et al. | |
| 2004/0078273 A1 | 4/2004 | Loeb et al. | |
| 2005/0171898 A1 | 8/2005 | Bishop | |
| 2006/0015463 A1* | 1/2006 | Gupta .................. G06Q 20/085 705/52 |
| 2007/0022058 A1* | 1/2007 | Labrou .................. G06Q 20/32 705/67 |
| 2007/0295797 A1* | 12/2007 | Herman .................. G06Q 10/10 235/375 |
| 2008/0046366 A1* | 2/2008 | Bemmel .................. G06Q 20/20 705/44 |
| 2008/0046980 A1* | 2/2008 | Peng ...................... H04L 67/306 726/4 |
| 2008/0052226 A1 | 2/2008 | Agarwal et al. | |
| 2013/0204790 A1* | 8/2013 | Agarwal ............... G06F 17/277 705/44 |

FOREIGN PATENT DOCUMENTS

| | | |
|---|---|---|
| JP | H 08249283 A | 9/1996 |
| JP | H11-265413 A | 9/1999 |
| JP | 2002-163579 A | 6/2002 |
| JP | 2002-197024 A | 7/2002 |
| JP | 2003-308437 A | 10/2003 |
| JP | 2004-5515 A | 8/2004 |
| JP | 2004-240764 A | 8/2004 |
| JP | 2005-018265 A | 1/2005 |
| JP | 2005-208763 A | 8/2005 |
| JP | 2006-040235 A | 2/2006 |
| JP | 2001-357202 A | 12/2011 |
| WO | WO 0133522 A9 | 5/2002 |
| WO | WO 2004/006194 A1 | 1/2004 |
| WO | WO 2005/109268 A1 | 11/2005 |

\* cited by examiner

UTILIZING PHRASE TOKENS IN TRANSACTIONS

CROSS-REFERENCE TO RELATED APPLICATION

This application is a divisional of U.S. patent application Ser. No. 11/548,111, entitled UTILIZING PHRASE TOKENS IN TRANSACTIONS, filed Oct. 10, 2006, which claims benefit of U.S. Provisional Patent Application No. 60/823,611, entitled UTILIZING PHRASE TOKENS IN TRANSACTIONS, and filed Aug. 25, 2006, the entireties of which are incorporated herein by reference.

BACKGROUND

Generally described, computing devices and communication networks, such as the Internet, can facilitate various interactions among individuals. As applied to financial transactions, the integration of computing devices and communication networks has created expanded opportunities for entities, such as individuals and/or businesses, to complete transactions. In the simplest embodiment, two entities can transmit relevant financial information, such as account numbers, and/or personal information over the communication network to complete a transaction. At the same time, however, the expanded transactional opportunities can create additional concerns related to the exchange of detailed financial account information, such as bank account numbers, and/or personal information. In one aspect, the parties to a transaction may be hesitant about revealing detailed financial information and personal information because of the potential for fraudulent use of the information, especially if the other entity is unknown or not trusted. In another aspect, the parties to a transaction may be cautious to exchange financial information because of the potential for processing erroneous transaction information by one party, such as incorrect quantities, transaction amounts, or duplicate charges.

One attempt to mitigate the concerns associated with the exchange of financial information relates to the creation of third-party intermediary accounts. In accordance with this embodiment, a third-party service provider can establish specialized transactional accounts that are backed by a financial account, such as a checking account at a bank, a credit card account, a stored value card account, etc. If both parties to a financial transaction maintain specialized transactional accounts, the parties can freely exchange their transactional account information, in the form of an account identifier, which allows the service provider to debit/credit each respective account. In various alternatives, the service provider can adopt additional security in establishing the specialized transactional accounts and/or additional security in verifying proposed transactions to reduce fraudulent or erroneous transactions. Nevertheless, current approaches to facilitating transactions can become deficient in the representation of the specialized transaction account as a numerical account number. Furthermore, current approaches to the processing of transactions utilizing specialized transaction account numbers are not easily configurable by the account holder. For example, account holders typically do not have the ability to configure their conventional transaction account, such as by automatically configuring acceptance of transactions, limiting transaction exposure, and the like.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system and method for facilitating transactions utilizing phrase tokens are provided. Individual entities can be associated with unambiguous transaction phrase tokens, such as multiple word phrases. The transaction phrase tokens are associated with transaction accounts by a service provider such that the entities can complete a transaction without having to exchange transaction account information. In a transaction, a transaction phrase token is offered to an accepting party, which tenders the offered transaction phrase token to the service provider. The service provider processes the offered transaction phrase token according to configuration information specified for the transaction phrase token. The service provider can automatically process the transaction request or request additional information.

In accordance with an aspect, a system for processing transactions is provided. The system includes a token issuer component for generating transaction phrase tokens to transaction phrase token holders. Each transaction phrase token corresponds to a set of characters that in their entirety have a secondary meaning to a transaction phrase token holder. The transaction phrase tokens may be represented in a variety of manners. Additionally, each transaction phrase token is associated with a transaction account. The system also includes a token processing component for processing a request from a party other than the transaction phrase token holder. The request from the other party corresponds to a request to complete a transaction and it includes a representation of a transaction phrase token from the transaction phrase token holder.

The transaction phrase token processing service can processes the transaction request based on a configuration of the transaction phrase token. Based on the processing, the transaction phrase token processing service can facilitate a reconciliation of the transaction account associated with the transaction phrase token upon a successful processing of the transaction request, such as the debiting or crediting of the transaction account.

In accordance with another aspect, a system for facilitating transactions is provided. The system includes a transaction phrase token that is associated with a transaction account. The transaction phrase token corresponds to a set of characters selected in their entirety by a transaction phrase token holder associated with a transaction phrase token assignment request. The system also includes a transaction phrase token processing service for processing a request to complete a transaction request that includes a representation of the transaction phrase token. The transaction phrase token processing service can then process the transaction request based on a configuration of the transaction phrase token.

In accordance with a further aspect, another system for facilitating transactions is provided. In this embodiment, the system includes a transaction phrase token that corresponds to a set of characters associated with a transaction account. The system also includes a transaction phrase token processing service for processing a request to complete a transaction request that includes a representation of the transaction phrase token. In turn, the transaction phrase token processing service processes the transaction request based on a configuration of the transaction phrase token specified by the transaction phrase token holder.

In accordance with yet another aspect, a method for facilitating the processing of transactions is provided. The method may be implemented by a token processing service.

In accordance with the method, the token processing service obtains obtaining a request for completion of a transaction between two parties that includes a transmitting party. The transmitting party can be associated with a transaction phrase token that corresponds to a set of characters. To elicit a debiting of a transaction account associated with the transaction phrase token, the transmitting party solely transmits a transaction phrase token to a receiving party. The token processing service can then process the request for completion of the transaction based upon a configuration of the at least one transaction phrase token.

In accordance with a further aspect, a computer-readable medium having computer-executable components for facilitating transactions involving transaction phrase tokens is provided. The computer-executable components include a token account interface for selecting transaction phrase tokens. The transaction phrase token is associated with a transaction account. Additionally, the transaction phrase token corresponds to a set of characters selected by a transaction phrase token holder associated with a token assignment request. The computer-executable components also include a token processing component for obtaining transaction requests corresponding to an identified transaction phrase token. The token processing component processes the transaction request in accordance with configuration information associated with the identified transaction phrase token.

In yet another aspect, a method for facilitating the selection of transaction phrase tokens is provided. The method may be implemented by a token processing service. In accordance with the method, the token processing service obtains a user selection of an entire set of characters corresponding to a target transaction phrase token. The entire set of characters corresponds to the transaction phrase token that will be utilized to reconcile a transaction account. The token processing service determines whether the target transaction phrase token is unambiguous to a set of transaction phrase tokens. Additionally, the token processing service provides an indication of whether the transaction phrase token is unambiguous to a set of transaction phrase tokens on a user interface.

In still a further aspect, a method for facilitating the processing of transactions is provided. The method may be implemented by a transaction phrase token recipient. In accordance with the method, the transaction phrase token recipient obtains a request for a transaction from a transmitting party. The request for completion of the transaction includes a representation of a transaction phrase token that is associated with a transaction account. Additionally, the transaction phrase token consists of a set of characters selected in their entirety by a transaction phrase token holder associated with a transaction phrase token assignment request. The transaction phrase token recipient then transmits a request to a token processing service for completion of the transaction based upon a configuration of the at least one transaction phrase token.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
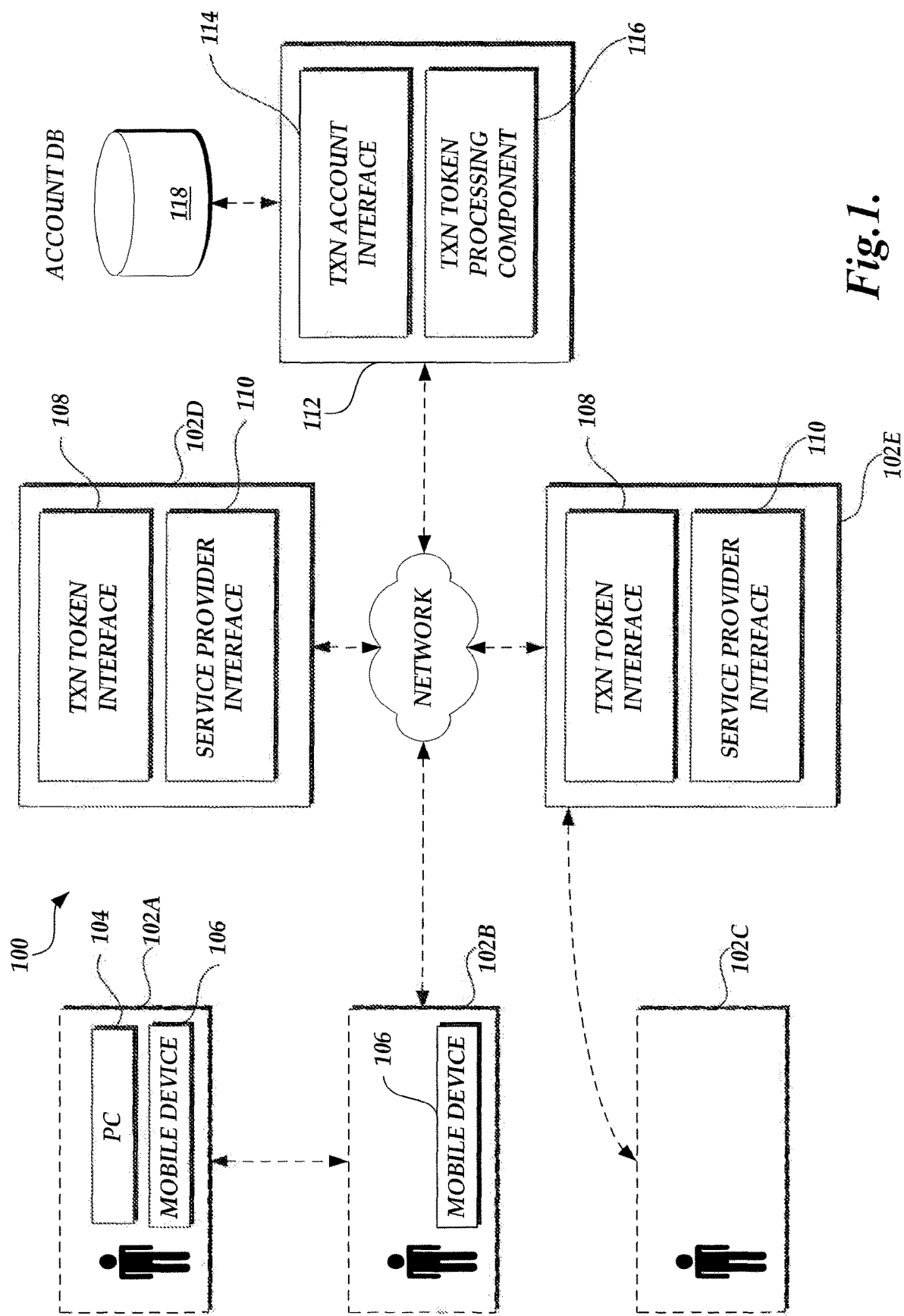
FIG. 1 is a block diagram illustrative of a system for processing transactions utilizing transaction phrase tokens and including a number of transaction phrase token holders and a transaction phrase token processing service in accordance with an aspect of the present invention.

Generally described, the present invention relates to the utilization of transaction phrase tokens to facilitate transactions. In one aspect, the present invention relates to systems and methods to facilitate transactions by the transmittal of at least one unambiguous transaction phrase token between two or more entities to a transaction, such as individuals, corporations, systems, computers, services, etc. In an illustrative embodiment, each unambiguous transaction phrase token corresponds to a set of one or more characters selected by the transaction phrase token holder that relays a secondary meaning to the transaction phrase token holder when communicated in their entirety, such as spoken, written, published, etc. The unambiguous phrase token may be specific to a particular language, dialect, or set of symbols (e.g., alphanumeric characters). The secondary meaning relayed by the transaction phrase token can correspond to a characteristic of a transaction phrase token holder (e.g., "Number One Pearl Jam Fan") or a characteristic of an intended use of the transaction phrase token (e.g., "Joe's Rent and Utilities").

Each transaction phrase token can be associated with configuration information that facilitates the processing of a transaction involving the transaction phrase token. In an illustrative embodiment, the configuration information can relate to the types of reconciliation activities (e.g., debits or credits) allowed for the transaction account associated with the transaction phrase token (e.g., bank accounts, credit card accounts, service provider created accounts, etc.), the specification of processing rules for specific vendors, goods/services, transaction amounts, expiration data, and the like. In another embodiment, a transaction phrase token may be controlled by an entity that controls the underlying transaction account. Alternatively, the transaction phrase token may be controlled by an entity (e.g., a secondary entity) designated by the entity controlling the underlying transaction account (e.g., a primary entity). For example, a parent controlling a transaction account may gift, lend, or authorize the use of a transaction phrase token to a child while maintaining control of the underlying transaction account and/or usage of the transaction phrase token. Accordingly, in another aspect, the present invention relates to systems and methods for facilitating the configuration and utilization of transaction phrase tokens by an entity controlling the transaction phrase token.

For purposes of illustration, a transaction phrase token system can be utilized to complete a transaction between two parties. Assume a transaction phrase token holder wishes to complete a transaction with another party that requires the transaction phrase token holder to transfer funds to the other party (e.g., the purchase of goods/services from the other party). To initiate the transfer of funds, the transaction phrase token holder offers a selected transaction phrase token to the other party, such as by submitting it via a Web page interface, interfacing a kiosk, uttering the transaction phrase token, etc. The other party receives the transaction phrase token with the understanding that submission of the offered transaction phrase token will result in the eventual transfer of a transferable instrument, such as currency, credits, loyalty points, etc., from a transaction account associated with the offered transaction phrase token. Upon receipt of the offered transaction phrase token, the other party may implement additional processing steps, such as security verifications, credit checks, etc.

With continued reference to the illustrative example, to elicit a transfer of funds/credit, the other party transmits a request for transfer of funds to a transaction phrase token processing service identifying relevant information to the transaction, such as a transaction amount, a representation of the offered transaction phrase token, and any additional information. The transaction phrase token processing service receives the request and can apply various processing rules associated with the offered transaction phrase token, including automatically approving/rejecting the transaction, notifying specific parties, requesting approval for the transaction from the transaction phrase token holder, etc. Based on a successful execution of the processing rules configured for the offered transaction phrase token, the transaction phrase token processing service can then utilize transaction account interfaces to cause or be caused a transfer of funds/credits from the transaction account associated with the transaction phrase token to a transaction account associated with the other party. Upon notification of the approved transaction and/or confirmation of the credit to its transaction account, the other party can instigate the fulfillment of any outstanding tasks associated with the transaction, such as shipping goods, completion/initiation of services, etc.

Although the present invention will be described with regard to an illustrative operating environment and components, illustrative transaction phrase token structures, illustrative examples for use of transaction phrase tokens, and illustrative screen displays, one skilled in the relevant art will appreciate that the disclosed embodiments are illustrative in nature and should not be construed as limiting.

With reference to FIG. 1, an illustrative transaction phrase token system 100 for processing transaction phrase tokens will be described. The system includes a number of transaction phrase token holders 102A, 102B, 102C, 102D, and 102E that can be associated with one or more transaction phrase tokens. In one aspect, the transaction phrase token holders can correspond to transaction phrase token transmitters that offer a transaction phrase token in which the transaction account associated with the transaction phrase token will be debited as part of a transaction. In another aspect, the transaction phrase token holder can correspond to transaction phrase token receivers that obtain a transaction phrase token and request a credit to a transaction account. In an illustrative embodiment, the transaction phrase token receiver may utilize another transaction phrase token as part of the transaction such that the configuration associated with the second transaction phrase token will be utilized to provide a credit to a transaction account associated with the second transaction phrase token. Alternatively, the transaction phrase token receiver may directly request a credit to a transaction account maintained by a transaction phrase token service provider.

In an illustrative embodiment, a transaction phrase token holder, such as transaction phrase token holders 102A, 102B, and 102C, can correspond to an individual that can communicate their transaction phrase tokens via various communication devices, such as personal computers 104, mobile phones 106, specialized devices (e.g., kiosks, point-of-sale terminals), written instruments, or even orally. As illustrated in FIG. 1, the quantity and type of communication device can vary among transaction phrase token holders. Additionally, a communication device may correspond to a generic communication device capable of accepting/transmitting transaction phrase tokens, such as a mobile phone. Alternatively, a communication device may correspond to a specially configured device for communicating transaction phrase tokens, such as a kiosk.

In another embodiment, the transaction phrase token holders can correspond to merchants/vendors/service providers, such as transaction phrase token holders 102D and 102E. In one aspect, the transaction phrase token holders 102D and 102E can receive transaction phrase tokens (e.g., as a receiver) from another transaction phrase token holder as part of a transaction. In another aspect, the transaction phrase token holders 102D and 102E may transmit transaction phrase tokens to another transaction phrase token holder as part of a transaction. The transaction phrase token holders 102D and 102E may transmit and/or receive transaction phrase tokens via a variety of communication devices, such as computing devices, specialized devices (such as kiosks or point-of-sale terminals), telephonic devices, voice interfaces, visual interfaces, or orally via human agents. As will be explained in greater detail below, the transaction phrase token holders 102D and 102E can implement a number of computer-executable components that facilitate interaction with other transaction phrase token holders, 102A-102C or 102D-102E (collectively "transaction phrase token holders 102"), and a transaction phrase token processing service. Specifically, the transaction phrase token holders 102D and 102E can include a transaction phrase token interface 108 for obtaining transaction phrase tokens from other transaction phrase token holders 102. In an illustrative embodiment, a specific transaction phrase token interface 108 may be selected to correspond with the method of obtaining transaction phrase tokens (e.g., kiosks, communication network, oral, telephone, etc.). The transaction phrase token holders 102D and 102E can also include a service provider interface 110 for communicating with a transaction phrase token processing service. As illustrated in FIG. 1, the different transaction phrase token holders 102 can communicate/transact business directly or over a communication network, such as the Internet.

The transaction phrase token system 100 can further include a transaction phrase token processing service 112 for facilitating the completion of transactions between two or more transaction phrase token holders 102. As will be explained in greater detail below, the transaction phrase token processing service 112 can obtain requests to debit/credit transaction accounts associated with transaction phrase tokens and process the requests accordingly. Although the processing of a transaction is described with regard to two transaction phrase token holders 102, the present invention may facilitate a transaction with the exchange of a single transaction phrase token. Additionally, in another aspect, the transaction phrase token processing service 112 can also interact with a transaction phrase token holder to facilitate the configuration of the holder's transaction phrase tokens.

The transaction phrase token processing service 112 can implement a transaction account interface 114 for facilitating the assignment and configuration of transaction phrase tokens by transaction phrase token holders 102. The transaction phrase token processing service 112 can also include a transaction phrase token processing component 116 for facilitating the processing of transaction requests. The transaction phrase token processing service can include an account data source 118, such as a database, data store, data files, etc., that includes financial information, transaction account information, and transaction phrase token configuration information.

One skilled in the relevant art will appreciate that the transaction phrase token processing service 112 can include additional software components that would be utilized to interact with various transaction phrase token holders 102 and/or facilitate the processing of transaction requests. For example, the transaction phrase token processing service 112 may include and/or interface with various financial and transactional software components or services to facilitate the maintenance and processing of transaction accounts. Additionally, the transaction phrase token processing service 112 may include and/or interface with various personalization and tracking software components or services to facilitate the personalization of the transaction phrase token processing service for each transaction phrase token holder. Additionally, although the transaction phrase token processing service 112 is illustrated as a single component in the system 100, one skilled in the relevant art will appreciate that the transaction phrase token processing service 112 can correspond to a number of computing components and/or computing devices that can be distributed across the communication network.

Figure 2A:
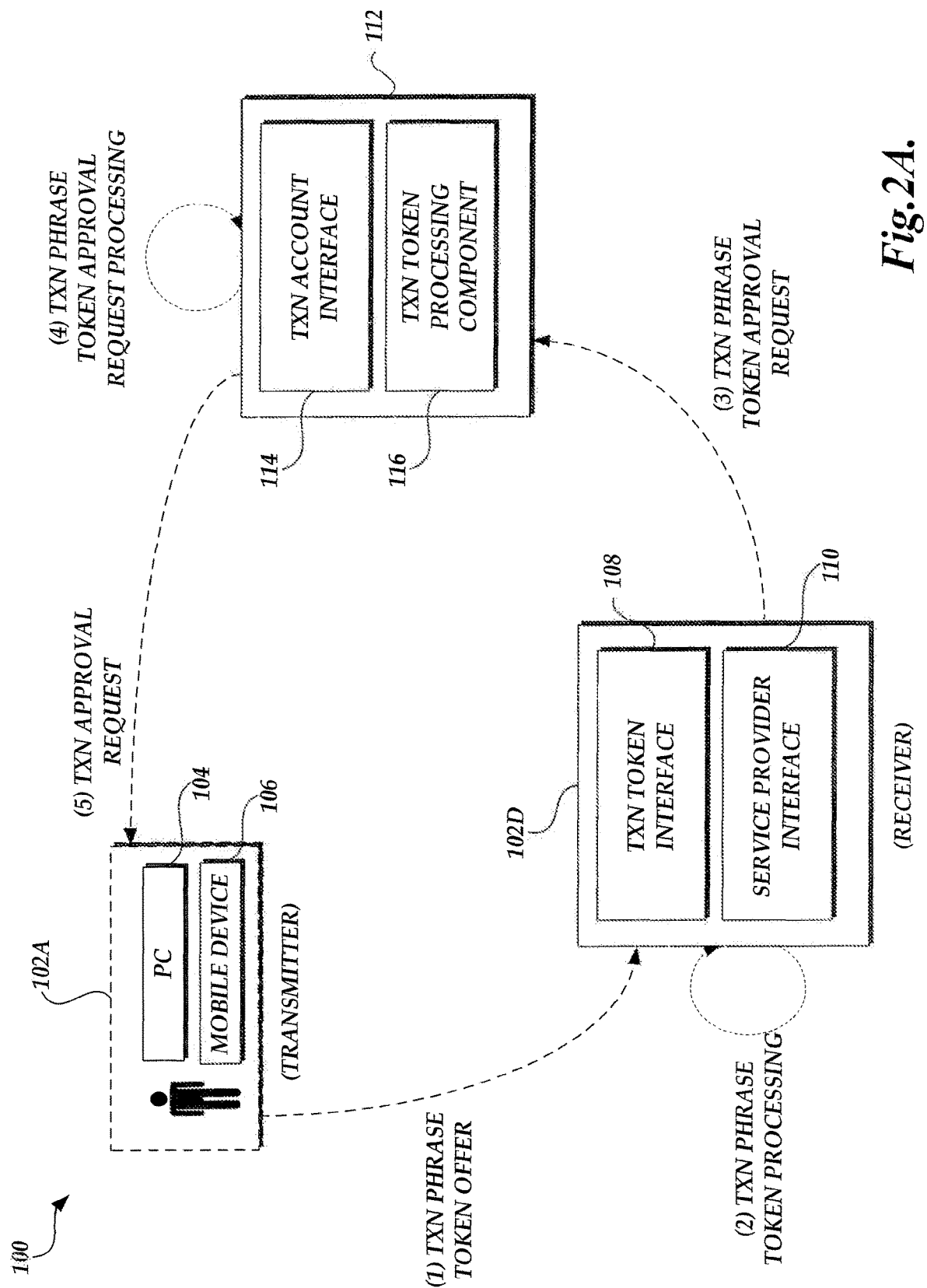
FIG. 2A is a block diagram illustrating the initiation and processing of a transaction phrase token offer by the system shown in FIG. 1 in accordance with an aspect of the present invention.

With reference now to FIGS. 2A-2E, illustrative interactions between two transaction phrase token holders (e.g., transaction phrase token holders 102A and 102D) and the transaction phrase token processing service 112 will be described. With reference to FIG. 2A, a transaction may begin with the interaction of two transaction phrase token holders, a receiver 102D and a transmitter 102A. It is assumed that based on some interaction, the transmitter 102A will offer a transaction phrase token to facilitate a payment to the receiver 102D from a transaction account associated with the offered transaction phrase token. Upon completion of the offer and/or the transfer of funds/credits to a transaction account associated with the receiver 102D, the transfer of control of an agreed upon element will be completed. For example, if the agreed upon element is a good, the transfer of control may be the physical exchange of the good. If the agreed upon element is a service, the transfer of control may be the performance/completion of the service.

As previously described, any one of a variety of communication methods may be utilized to transmit the transaction phrase token including, but not limited to, communication network software applications (e.g., a Web page, instant message, etc.), wireless communication applications (e.g., a text message, a Bluetooth transmission, etc.), specialized hardware/software (e.g., kiosks, point-of-sale terminals, connectable devices), orally (e.g., telephone or in person), and/or other publication mechanisms (e.g., tablet computing devices, barcodes, paper, etc.). As previously also described, the transaction phrase token is made up of a set of characters that relay a secondary meaning to the transaction phrase token holder when communicated in their entirety, such as spoken, written, published, etc. (e.g., "I Love Coffee").

Based on the transaction phrase token that is offered, the receiver 102D may conduct some internal processing of the transaction phrase token. In an illustrative embodiment, the receiver 102D may hold shipment or fulfillment of the agreed upon element until the transaction has been finalized. In another embodiment, the receiver 102D may request additional information from the transmitter 102A for completion of security provisions. For example, the receiver 102D may request a PIN or password. In a further embodiment, the receiver 102D may request a backup form of payment, such as a credit card. In still a further embodiment, the receiver 102D may also implement some initial processing to identify whether the received transaction phrase token is similar in representation to other existing transaction phrase tokens. For example, if the receiver 102D has received a verbal representation of a target phrase token (e.g., "Red Book"), the receiver may determine whether there are other transaction phrase tokens in the system 100 that are phonetically similar (e.g., "Read Book"). Similarly, if the receiver 102D has received a written representation (e.g., "Potatoe Salad"), the receiver 102D attempts to identify other similarly spelled or properly spelled transaction phrase tokens (e.g., "Potato Salad"). In this embodiment, the receiver 102D may ask the transmitter 102A to verify the appropriate transaction phrase token.

After the completion of any initial processing, the receiver 102D transmits a request to the transaction phrase token processing service 112 for approval of the transaction. The request can include information corresponding to the transaction, such as identification of the offered transaction phrase token from the transmitter 102A, additional information about either transaction phrase holders, description information regarding the transaction, and a transaction phrase token for the receiver 102D (or other transaction account processing information).

Upon receipt of the request, the transaction phrase token processing service 112 may initiate automatic processing of the transaction phrase token processing request. In an illustrative embodiment, each transaction phrase token may be configured with a number of processing rules/instructions that can be executed by the transaction phrase token processing service 112. In one embodiment, the processing rules can correspond to an automatic approval/rejection of a request by a specific transaction phrase token receiver, e.g., never accept a transaction phrase token request from this company. In another embodiment, the processing rules can correspond to value thresholds for automatic approval/rejection for all transactions, e.g., approve all transactions under $10. In a further embodiment, the processing rules can correspond to an automatic approval/rejection for a type of good/service or class of goods/services, e.g., automatically reject any transaction associated with adult materials. In a still further embodiment, the processing rules can correspond to limitations of use of the transaction account associated with transaction phrase tokens. For example, a transaction account associated with a transaction phrase token may only be configured to be credited and can never be debited. Still further, the processing rules can correspond to a request to require approval of the proffered transaction by a transaction phrase token holder or other designated authority. For example, all transaction phrase tokens could be configured as a default to require transaction phrase token transmitter approval for all transactions. In yet another embodiment, the processing rules can correspond to expiration or cancellation data that specify whether the transaction phrase token can be actively utilized for a transaction. One skilled in the relevant art will appreciate that various configuration options, including the combination of various processing rules or the addition/exclusion of processing, could be exercised in accordance with a transaction phrase token.

With continued reference to FIG. 2A, in the event that transmitter approval is required, the transaction phrase token processing service 112 can communicate the approval request to the transmitter 102A. In an illustrative embodiment, the transaction phrase token processing service can utilize any one of a variety of communication methods for notifying the transmitter 102A and requesting approval. In one embodiment, the transaction phrase token processing service may transmit an electronic message, such as an email, text message, or instant message, to a designated communication account associated with the transmitter 102A. In another embodiment, the transmitter 102A may be presented with a batched set of transaction approval requests via a secure Web page. In a further embodiment, the transmitter 102A may be presented with an approval interface generated by a specialized device (e.g., a kiosk) located at a physical location associated with the receiver 102D. For example, the transmitter 102A may be required to log on to a kiosk and approve a transaction while he or she is physically inside the receiver's place of business. In still a further embodiment, the transaction phrase token processing service 112 may provide an interactive voice service that allows a transmitter 102A to approve a transaction over a telephone-based interface. Additional or alternative notification/approval methodologies may also be implemented.

Figure 2B:
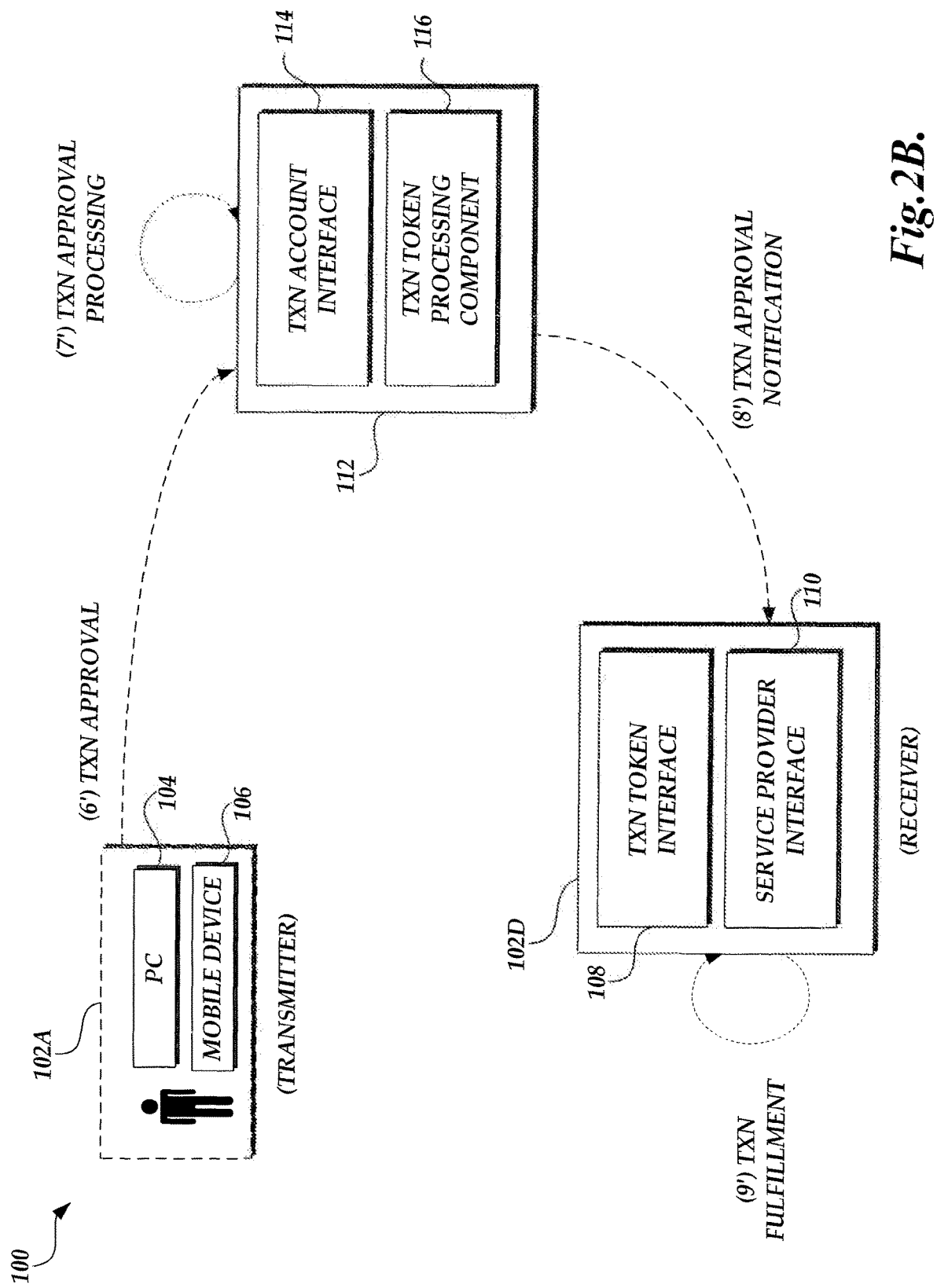
FIG. 2B is a block diagram illustrating the processing of an approval of a transaction phrase token request by a transaction phrase token holder by the system shown in FIG. 1 in accordance with an aspect of the present invention.

With reference now to FIG. 2B, in an illustrative embodiment, the transmitter 102A may transmit an approval for the transaction in the manner described above. The transaction phrase token processing service 112 can then process the approval. In one aspect, the transaction accounts of the receiver and transmitter can be credited and debited respectively in the manner prescribed by the transaction. In another aspect, the transmitter 102A can provide feedback to the transaction phrase token processing service 112 for additional configuration of their transaction phrase tokens, which will be described in greater detail below. In a further aspect, the transaction phrase token processing service 112 may also maintain and update ratings, or other statistical tracking information, for each transaction phrase token holder 102A, 102D regarding the number of approvals and any additional feedback regarding either the transmitter 102A or receiver 102D. The transaction phrase token processing service 112 may also transmit a notification to the receiver 102D of the approval.

Figure 2C:
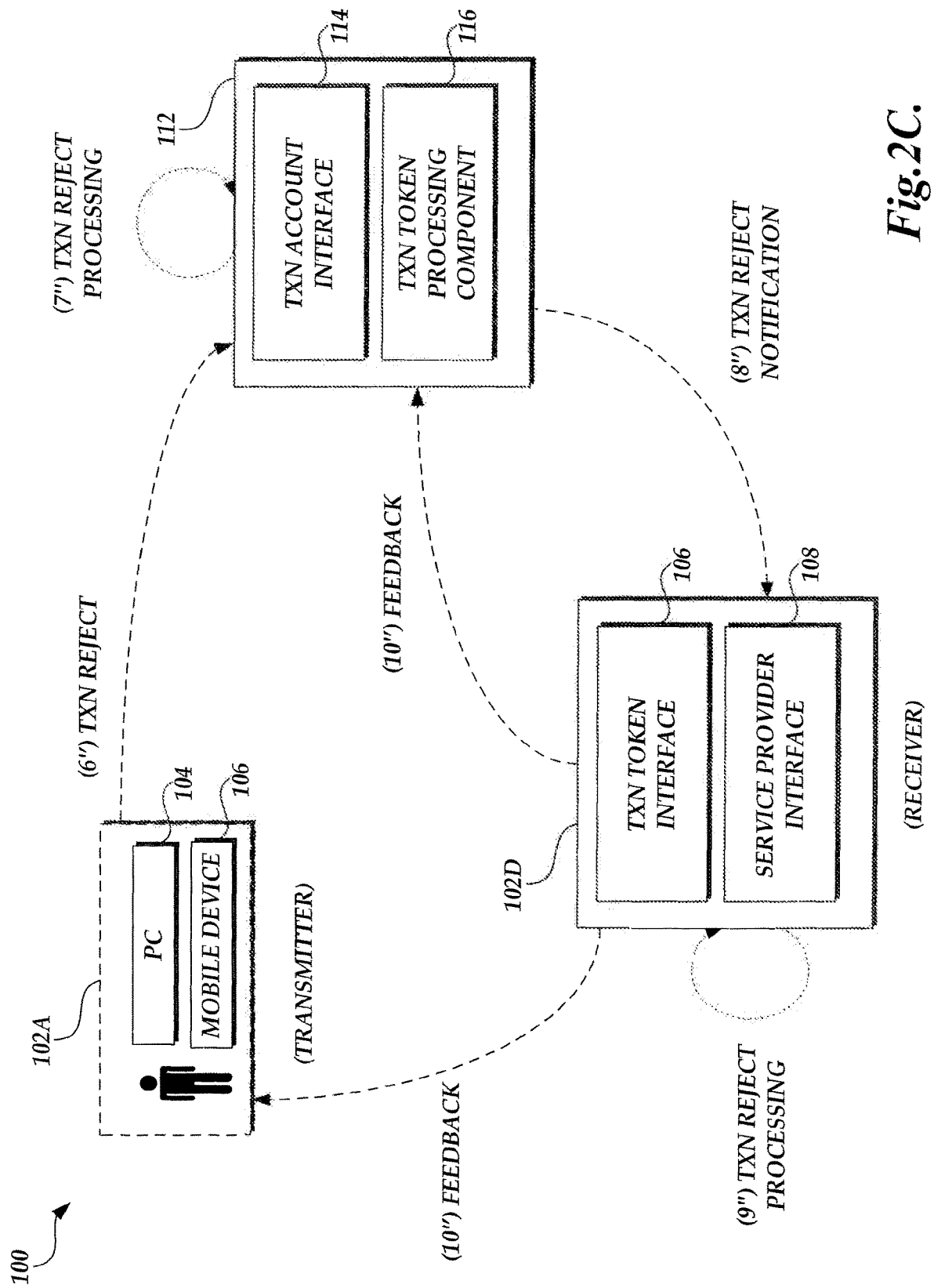
FIG. 2C is a block diagram illustrating the processing of a rejection of a transaction phrase token request by a transaction phrase token holder by the system shown in FIG. 1 in accordance with an aspect of the present invention.

With reference now to FIG. 2C, in an alternative embodiment to FIG. 2B, the transmitter 102A may transmit a rejection for the transaction in the manner described above. The transaction phrase token processing service 112 can then process the rejection in a number of ways. In one aspect, the transmitter 102A can provide feedback to the transaction phrase token processing service 112 for additional configuration of their transaction phrase tokens, which will be described in greater detail below. In another aspect, the transaction phrase token processing service 112 may also maintain and update ratings, or other statistical tracking information, for each transaction phrase token holder regarding the number of rejections and any additional feedback regarding either the transmitter 102A or receiver 102D. In yet another aspect, the transaction phrase token processing service 112 can transmit a notification to the receiver 102D. Based on the notification, the receiver 102D can provide feedback to the transmitter 102A and/or the transaction phrase token processing service 112 to rectify the transaction or clarify information associated with the rejected transaction. For example, the receiver 102D may attempt to clarify an error in the request and/or obtain additional information from the transaction phrase token processing service 112 or the transmitter 102A.

Figure 2D:
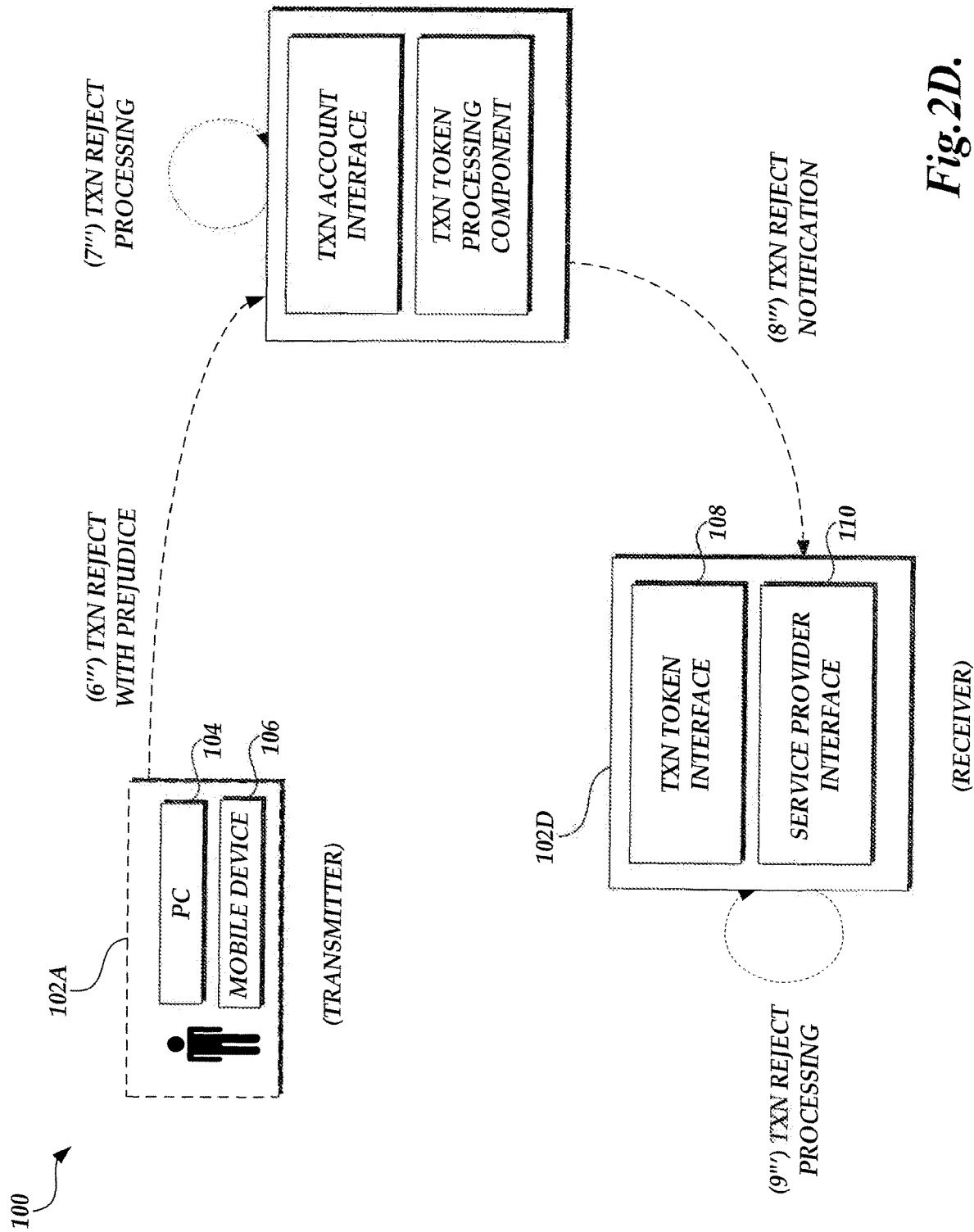
FIG. 2D is a block diagram illustrating the processing of a rejection with prejudice of a transaction phrase token request by a transaction phrase token holder by the system shown in FIG. 1 in accordance with an aspect of the present invention.

With reference now to FIG. 2D, in an alternative embodiment to FIG. 2B and similar to FIG. 2C, the transmitter 102A may transmit a rejection with prejudice for the transaction in the manner described above. In this embodiment, it is assumed that the request to process the offered transaction phrase token for completion of the transaction cannot be corrected. Similar to FIG. 2C, the transaction phrase token processing service 112 can then process the rejection with prejudice in a number of ways. In one aspect, the transaction phrase token processing service 112 may maintain and update ratings, or other statistical information, for each transaction phrase token holder regarding the number of rejections with prejudice and any additional feedback regarding either the transmitter 102A or receiver 102D. The transaction phrase token processing service 112 then transmits a notification of the rejection with prejudice to the receiver 102D. Based on the notification, the receiver 102D can process the rejection with prejudice and may not necessarily provide feedback. For example, the receiver 102D may terminate the fulfillment process or initiate a request for return of the agreed upon element of the transaction.

Figure 2E:
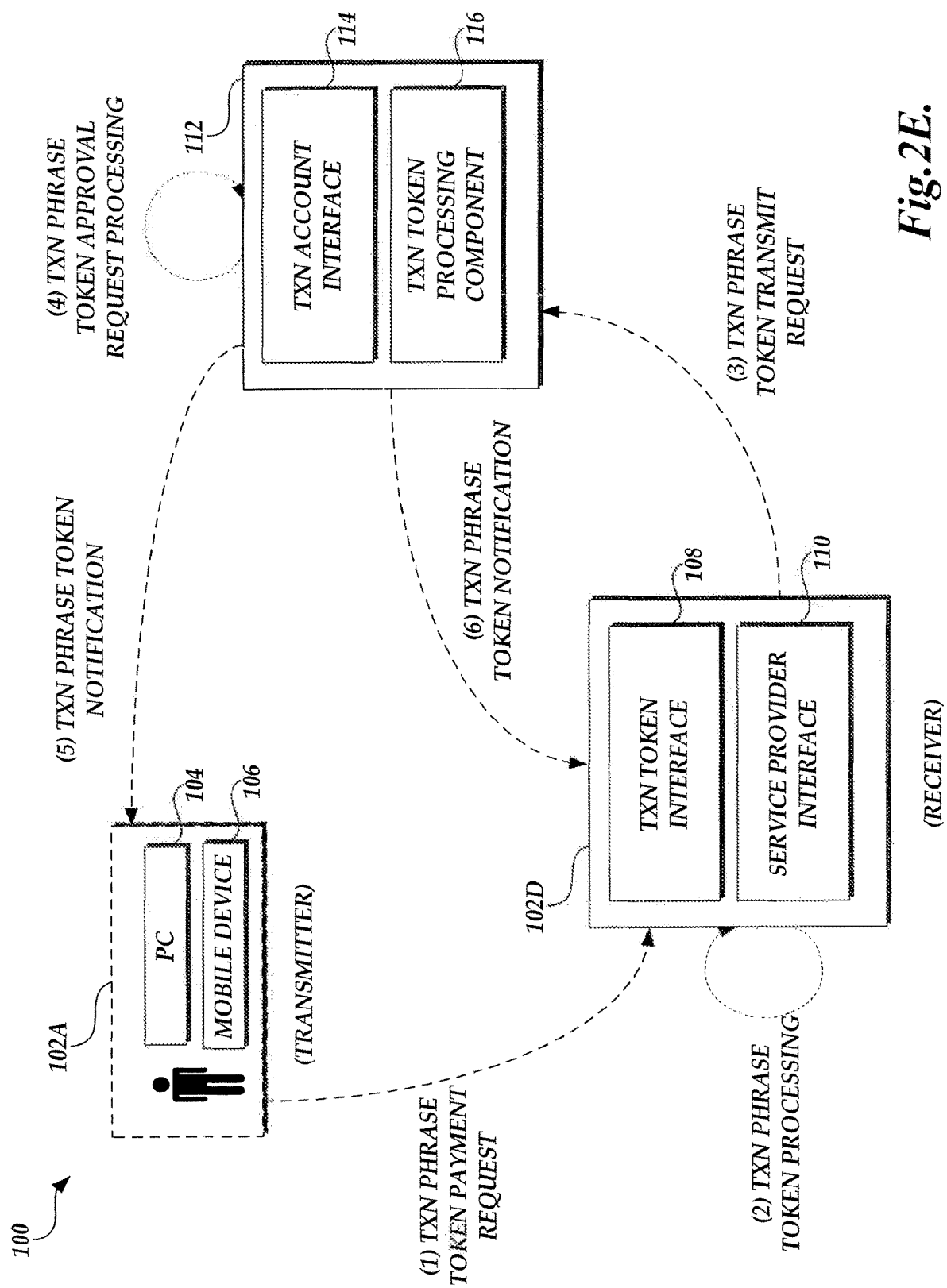
FIG. 2E is a block diagram illustrating the initiation and processing of a transaction phrase token transfer request by a transaction phrase token holder by the system shown in FIG. 1 in accordance with an aspect of the present invention.

With reference now to FIG. 2E, in another illustrative embodiment, another transaction may begin with the interaction between two transaction phrase token holders, a receiver 102D and a transmitter 102A. In this embodiment, it is assumed that, based on some interaction, the transmitter 102A will offer a transaction phrase token to receive a payment from the receiver 102D to a transaction account associated with the transmitter's transaction phrase token. For example, the transaction phrase token of the transmitter 102A may correspond to a charity wishing to have other entities donate to its cause. As previously described, any one of a variety of communication methods may be utilized to transmit the transaction phrase token including, but not limited to, communication network software applications, mobile phone, specialized hardware/software, oral communications, and/or other publication mechanisms. As previously described, the transaction phrase token is made up of a set of characters that relay a secondary meaning when communicated in their entirety, such as spoken, written, published, etc. (e.g., "Red Cross Hurricane Relief Effort").

Based on the transaction phrase token that is offered, the receiver 102D may conduct some internal processing of the transaction phrase token. In an illustrative embodiment, the receiver 102D may request additional information for completion of security provisions. For example, the receiver 102D may request a PIN or password from the transmitter 102A. After the completion of any initial processing, the receiver 102D transmits a request to the transaction phrase token processing service 112 for approval of the transaction. The request can include information corresponding to the transaction such as the identification of the offered transaction phrase token from the transmitter 102A, additional information about either transaction phrase holder, description information regarding the transaction, and/or a transaction phrase token associated with the receiver 102D (or other transaction account processing information).

Upon receipt of the request, the transaction phrase token processing service 112 may initiate automatic processing of the transaction phrase token processing request. As described above, each transaction phrase token may be associated with a number of processing rules/instructions that can be executed by the transaction phrase token processing service 112. In this aspect, one or more processing rules may be implemented to prevent spoofing of the receiver's transaction phrase token. In one embodiment, the processing rules can include an automatic approval/rejection of a request by a specific transmitter, e.g., never accept a transaction phrase token request from this company. In another embodiment, the processing rules can include value thresholds for an automatic approval/rejection for all transactions. In a further embodiment, the processing rules can include an automatic approval/rejection for a type of good/service or class of goods/services. In a still further embodiment, the processing rules can correspond to limitations of use of the transaction account associated with transaction phrase tokens. Still further, the processing rules can correspond to a request to require transmitter approval. In the illustrative embodiment described, however, the transaction phrase token processing service 112 will not typically require an approval from the transmitter since their account will most likely be credited. Upon the credit and debit of the transmitter and receiver transaction accounts, respectively, the transaction phrase token processing service 112 can notify the transmitter 102A and receiver 102D of the completed transaction.

Figure 3:
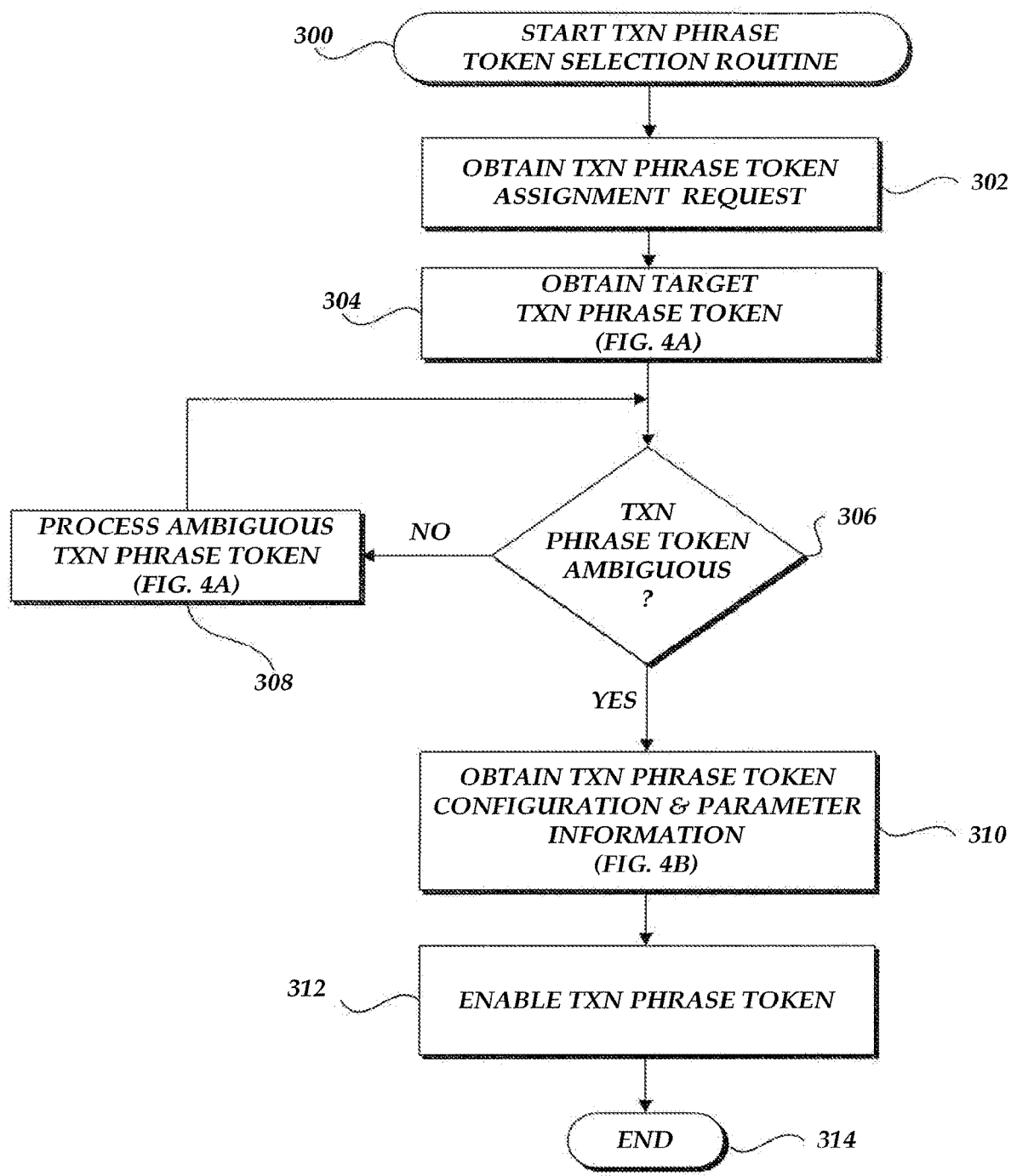
FIG. 3 is a flow diagram illustrative of a transaction phrase token assignment routine implemented by a transaction phrase token processing service in accordance with an aspect of the present invention.

With reference to FIG. 3, a transaction phrase token assignment and configuration routine 300 implemented by the transaction phrase token processing service 112 will be described. At block 302, the transaction account interface component 114 of the transaction phrase token processing service 112 obtains a transaction phrase token assignment request. In an illustrative embodiment, the request can originate upon an unprompted request by a potential transaction phrase token holder, such as through an Internet Web page. Additionally, the transaction phrase token request can be directly related to the completion of a transaction, such as in response to a prompt to secure a transaction phrase token to provide payment and/or in response to a request to secure a transaction phrase token to accept payment.

At block 304, the transaction account interface component 114 obtains a target transaction phrase token from the potential transaction phrase token holder. In an illustrative embodiment, the target transaction phrase token may be obtained via a user interface generated on a communication device, such as a personal computer. An interface for obtaining a target transaction phrase token will be described below with regard to FIG. 4A. At decision block 306, a test is conducted to determine whether the target transaction phrase token is proper. In one aspect, the set of characters making up the target transaction phrase token may be required to be unambiguous to at least a class of transaction phrase token holders 102. For example, a target transaction phrase token may not be able to be exactly identical or a simple variation (e.g., plural, common misspelling, etc.) to another existing transaction phrase token. Additionally, the target transaction phrase token may also be required to be unambiguous in its various representation (e.g., such as a representation of the transaction phrase token utilizing dual-tone multi-frequency "DTMF", pronunciation of the transaction phrase token, etc.).

If the target transaction phrase token is not determined to be unambiguous, at block 308, the transaction account interface component 114 processes the non-unambiguous target transaction phrase token and the routine 300 returns to decision block 306. In an illustrative embodiment, the transaction account interface component 114 may provide visual cues on a screen display if a target transaction phrase token is not unambiguous. Additionally, the transaction account interface component 114 may also suggest alternative transaction phrase tokens based on a variation of a previously submitted target transaction phrase token, based on information associated with the transaction phrase token holder, from a source of available or commonly used transaction phrase tokens, such as a database or data store. In another aspect, each target transaction phrase token may be required to be proper according to the policies of the transaction phrase token processing service 112. In one embodiment, the transaction phrase token service 112 may prohibit a transaction phrase token that include offensive words or phrases. In another embodiment, the transaction account interface component 114 may include logic that attempts to verify secondary meaning based on dictionaries, black lists, excluded terms, and the like. The transaction account interface component 114 may utilize the interface illustrated in FIG. 4A for processing the non-unambiguous target transaction phrase token.

Figure 4A:
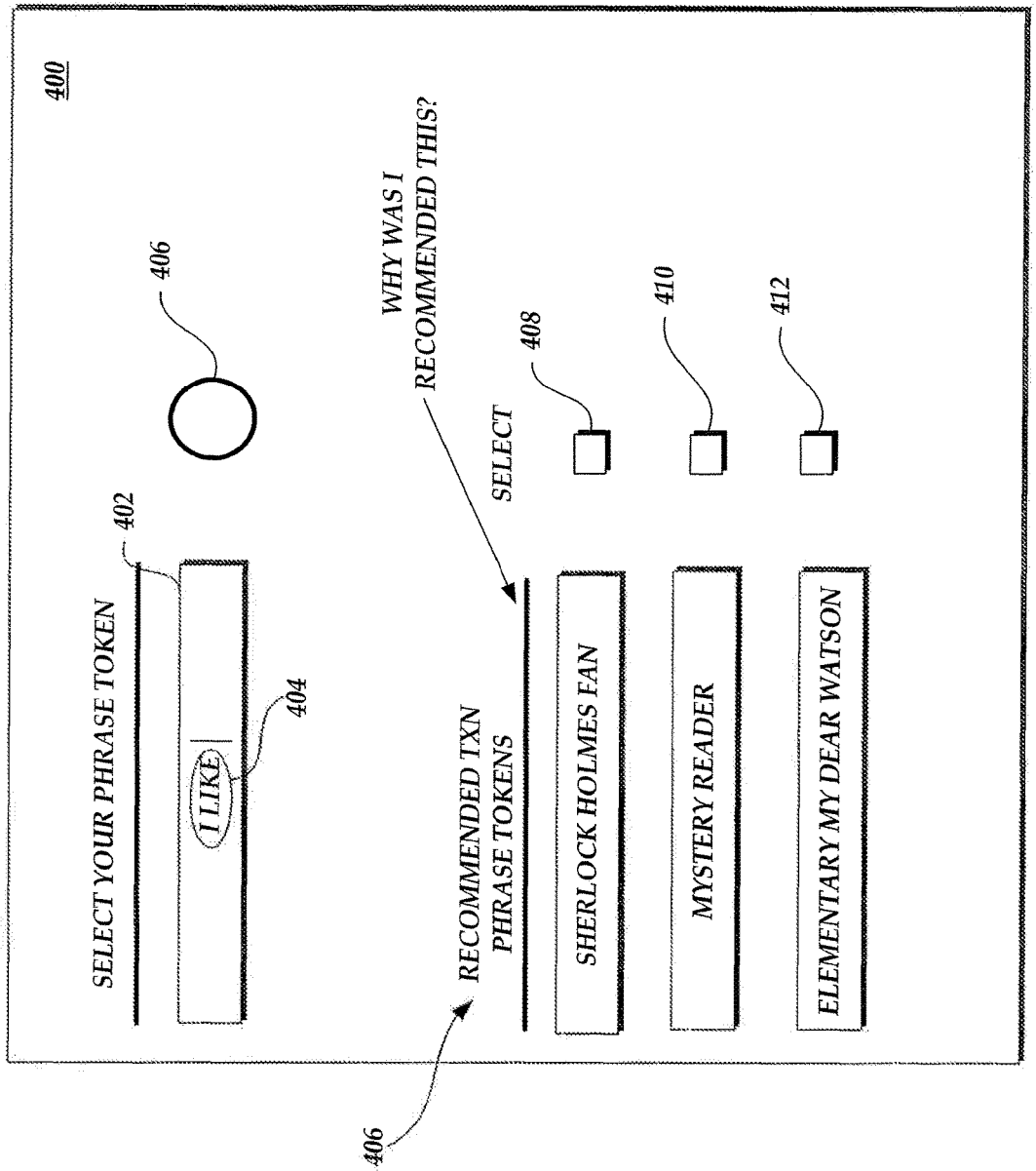
FIG. 4A is a block diagram illustrative of a screen display generated by a computing device for facilitating the assignment of a transaction phrase token for a transaction phrase token holder in accordance with an aspect of the present invention.

With reference now to FIG. 4A, a screen display 400 generated by a computing device for facilitating the selection of a target transaction phrase token will be described. As illustrated in FIG. 4A, the screen display 400 includes a first input portion 402 for obtaining data entry corresponding to a target transaction phrase token, such as via a keyboard, touchpad, and the like. Accordingly, the screen display 400 may provide a section for entering various target transaction phrases. As previously described, the screen display can visually indicate when a transaction phrase token is proper by modifying some appearance of the proposed transaction phrase token. For example, the proposed transaction phrase token may be displayed in a red font as it is typed out until it has been determined to be a proper phrase token (e.g., some discernable secondary meaning) and/or an established ambiguity value as illustrated at 404. Additionally, the screen display 400 can include visual cues, such as stoplight 406, for indicating whether the submitted target transaction phrase token is proper and/or unambiguous.

With continued reference to FIG. 4A, the screen display 400 can include a second portion 408 that utilizes various resources to suggest acceptable transaction phrase tokens to a potential transaction phrase token holder. In one embodiment, the transaction account interface component 114 can utilize a recommendations engine to select various phrases or terms that correspond to various items (e.g., products/services) associated with an individual. One skilled in the relevant art will appreciate that a recommendations engine can provide recommendations for an individual based upon purchase histories, Web page browse histories, search term histories, session tracking histories, ownership or rental lists, preferences, and the like. For example, if the user has purchased a number of Sherlock Holmes mystery books, the screen interface may suggest "Sherlock Holmes Fan" 410 or "Mystery Fan" 412 as a potential transaction phrase token. The transaction account interface component 114 may also utilize additional resources associated with an identified individual profile to generate phrases most likely to be unique with items found in the profile. With regard to the previous example, the transaction account interface component 114 may browse all the above-identified Sherlock Holmes mystery books and identify "Elementary, My Dear Watson" 414 as a phrase that is statistically most likely to be common among these books. Still further, the transaction account interface component 114 may provide a listing of available transaction phrase tokens from a data source, such as a database. The listing may correspond to previously utilized transaction phrase tokens, a selection of various pop culture phrases (or variations thereof), a manual listing of potential transaction phrase tokens, and the like.

In still a further embodiment, the transaction account interface component 114 may require qualifications for an entity to select a target transaction phrase token. For example, the transaction account interface component 114 may classify certain transaction phrase tokens as "premium" transaction phrase tokens. In one aspect, the transaction account interface component 114 may require a transfer of funds from a transaction account to acquire premium transaction phrase tokens. In another aspect, the transaction account interface component 114 may implement use requirements to qualify for a premium transaction phrase token and/or to maintain a selected premium transaction phrase token (e.g., an individual must complete a certain number of transactions a month to qualify for a premium transaction phrase token). One skilled in the relevant art will appreciate that additional or alternative suggestion/verification mechanisms could also be incorporated into the screen display or as part of multiple screen displays.

Returning to FIG. 3, once an unambiguous target transaction phrase token is identified, at block 310, the transaction account interface component 114 obtains configuration information for the transaction phrase token. In an illustrative embodiment, the transaction account interface component 114 can generate an interface for obtaining transaction phrase token configuration information, as will be illustrated with regard to FIG. 4B. In an illustrative embodiment, the transaction account interface component 114 may prompt a user to identify one or more service provider accepted transaction accounts (e.g., bank accounts, credit card accounts, service provider created accounts, etc.) that will be used to reconcile the transactions associated by the selected transaction phrase token. In another embodiment, the transaction account interface component 114 can obtain additional financial information to create a service provider accepted transaction account. At block 312, the transaction account interface component 114 enables the target transaction phrase token for use. In an alternative embodiment, the transaction phrase token processing service 112 may also implement some type of waiting period and additional controls to prevent misuse of newly acquired transaction phrase tokens. Still further, the transaction phrase token processing service 112 may also offer the transaction phrase token holder with the option of selecting other similarly spelled or similarly pronounced transaction phrase tokens.

Figure 4B:
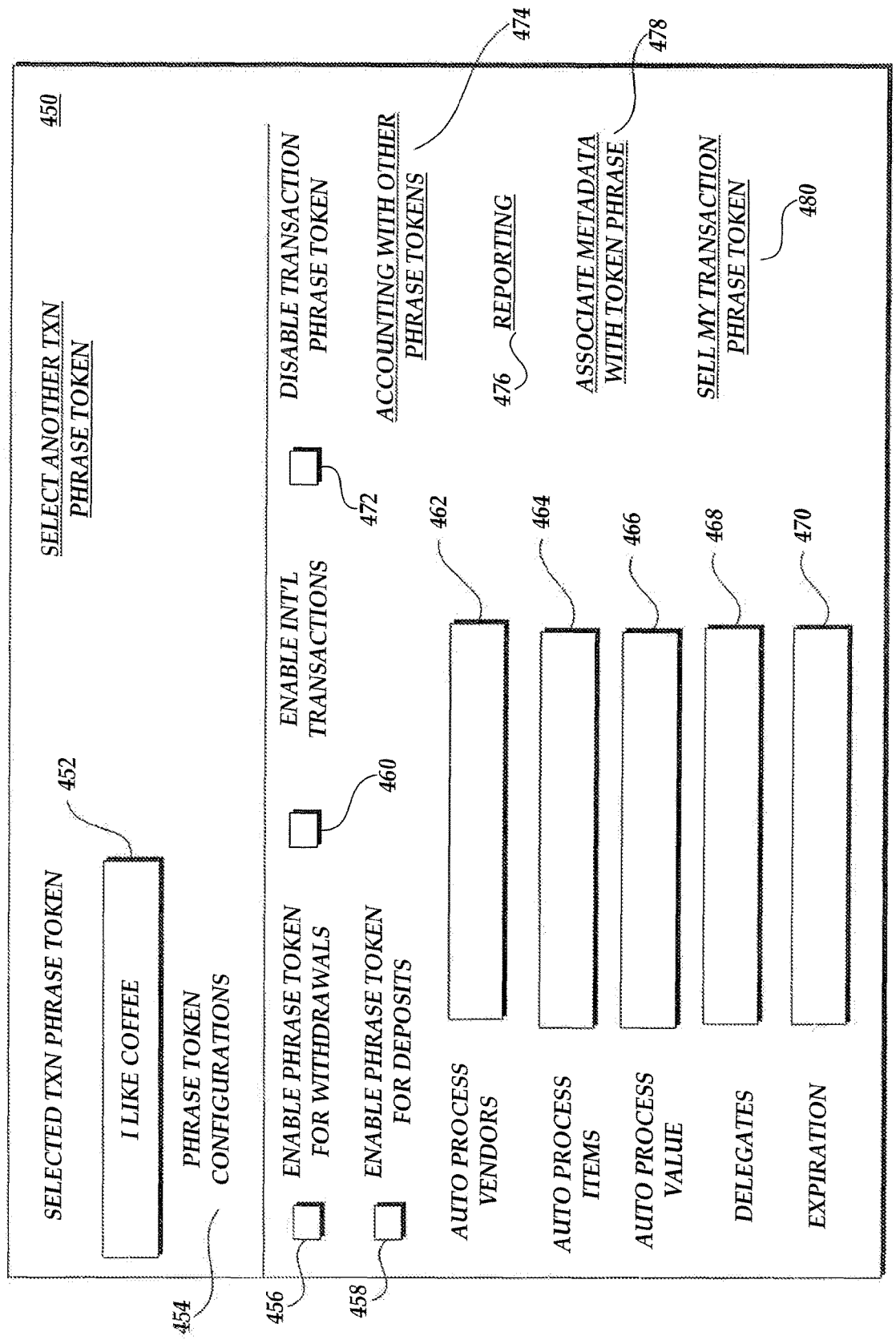
FIG. 4B is a block diagram illustrative of a screen display generated by a computing device for facilitating the configuration of a transaction phrase token in accordance with an aspect of the present invention.

With reference now to FIG. 4B, a block diagram illustrative of a screen display 450 generated by a computing device for facilitating the configuration of a transaction phrase token will be described. As illustrated in FIG. 4B, the screen display 450 includes a first portion 452 identifying the selected transaction phrase token that is to be configured. The screen display 450 also includes a second portion 454 for obtaining various transaction phrase token configuration information. In one embodiment, the screen display 450 can allow a transaction phrase holder to select whether the transaction account associated with the transaction phrase token can be utilized for debits only or credits only. For example, the screen display 450 can provide a selectable control 456 for configuring the transaction phrase token for debits and another selectable control 458 for configuring the transaction phrase token for credits. In another embodiment, the screen display 450 can allow a transaction phrase holder to select whether the transaction phrase holder will be used for international transactions and/or which currencies will be enabled, such as with control 460. One skilled in the relevant art will appreciate that controls 456, 458, and/or 460 may be configured to a default setting.

In a further embodiment, the screen display 450 can allow a transaction phrase holder to specify automatic processing rules for various transactions. For example, the transaction phrase holder can automatically approve or reject transactions from another identifiable entity, such as a vendor, by selecting or otherwise inputting identification information in control 462. In another example, the transaction phrase holder can automatically approve or reject transactions for a specific good/item or class of good or item by selecting from a list of recently acquired items, selecting items from a catalog or providing description information in control 464. In a further example, the transaction phrase holder can automatically approve or reject transactions based on a transaction amount in control 466. In still a further example, the transaction phrase holder can identify one or more delegates in control 468 that are allowed to utilize the transaction phrase token. In yet another example, the transaction phrase holder can specify expiration data (e.g., date or time ranges) in a control 470 in which the transaction phrase token will not be available for use in a transaction. In still another example, the transaction phrase token holder can manually select whether the transaction phrase token is enabled in a control 472. One skilled in the relevant art will appreciate that the transaction phrase holder can specify a combination of processing rules (e.g., automatically accept all transactions from my son to Joe's Bookstore for textbooks if they are under $100).

With continued reference to FIG. 4B, the second portion 454 of the screen display 450 can also include additional configuration services associated with a selected transaction phrase token. In one aspect, a transaction phrase holder may be allowed to implement accounting with other transaction phrase holders, such as by selecting link 474. For example, a transaction phrase token (e.g., "College Roommates Rent and Utilities") may be set up to pay all rent and utilities payments by a transaction account associated with a specific transaction phrase token. In turn, the transaction phrase holder can account for a division of the debit to one or more transaction accounts associated with other transaction phrase tokens (e.g., "Peter's Rent", "John's Rent", and "Bill's Rent"). In another aspect, the transaction phrase holder may wish to access advanced transaction phrase token reporting services, such as by selecting link 476. For example, the transaction phrase token processing service 112 may provide a detailed listing of all pending transactions for approval, all approved transactions, all rejected transactions, etc. In another example, the transaction account interface component 114 may provide statistical information such as an identification of the entities that have transferred the most funds to the transaction phrase token holder or an identification of the entities that have received the most funds from a transaction phrase token holder, and the like.

In a further aspect, a transaction phrase holder may wish to associate various metadata to a particular transaction phrase token to allow for additional mining of its usage, such as by selecting link 478. For example, "I Love Coffee" can be associated with all entertainment-related expenses. The transaction account interface component 114 can then utilize the metadata to provide additional statistical information processing services to the transaction phrase token holder. For example, the transaction account interface component 114 can provide a monthly listing of entertainment-related transfers by identifying all transactions associated with transaction phrase tokens having "entertainment" as metadata. In still a further aspect, the transaction phrase token processing service 112 may also provide a marketplace for the selling/usage of transaction phrase tokens, such as by selecting link 480. In an illustrative embodiment, certain transaction phrase tokens may be highly sought after, e.g., "I Love Coffee." Accordingly, a transaction phrase token holder may be able to explore the appraisal, selling, and/or renting of a transaction phrase token. One skilled in the relevant art will appreciate that the selection of links 474-480 may result in the generation of additional screen displays to enable the additional configuration services.

Figure 5:
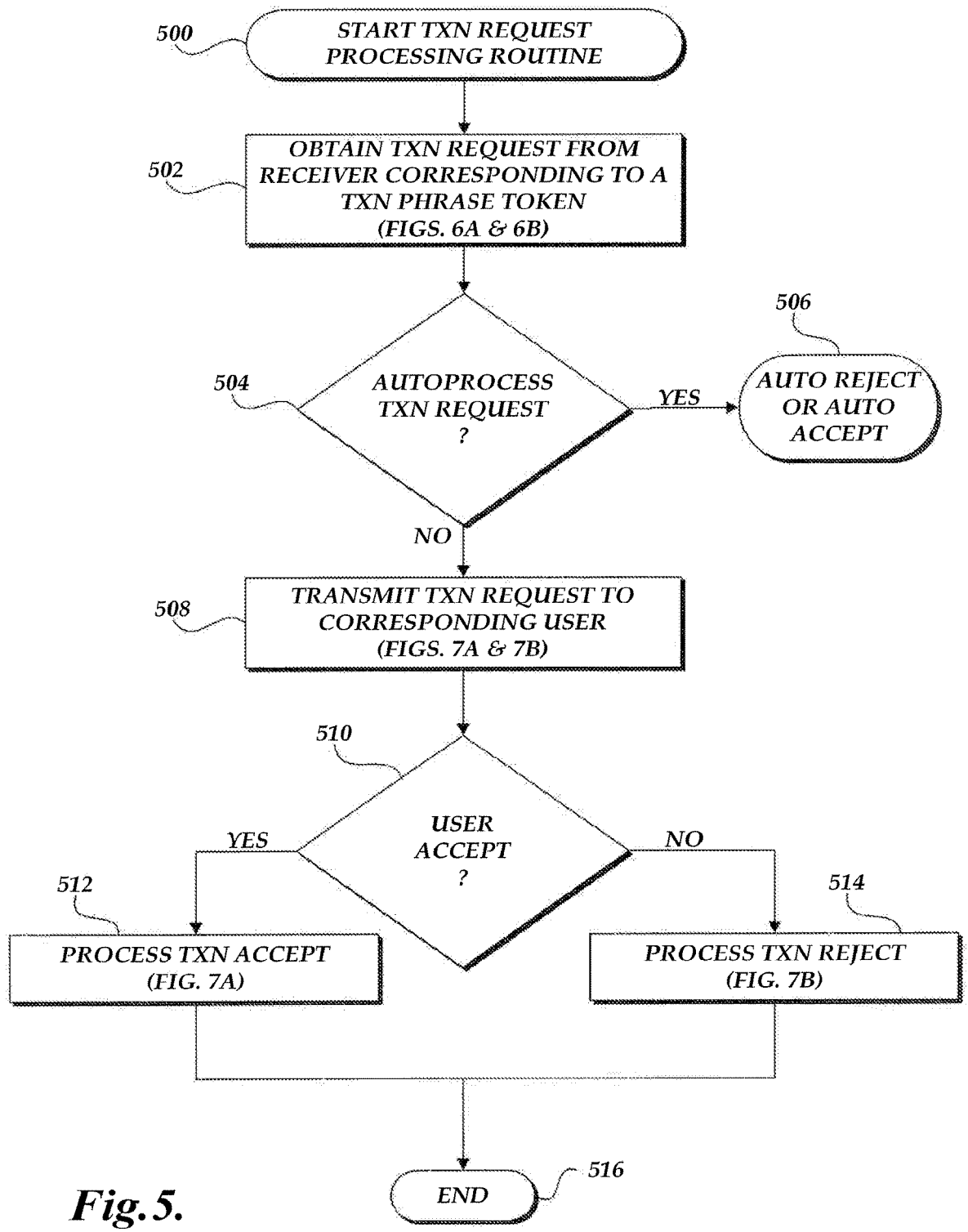
FIG. 5 is a flow diagram illustrative of a transaction processing routine corresponding to transaction phrase tokens implemented by a transaction phrase token processing service in accordance with an aspect of the present invention.
Figure 6B:
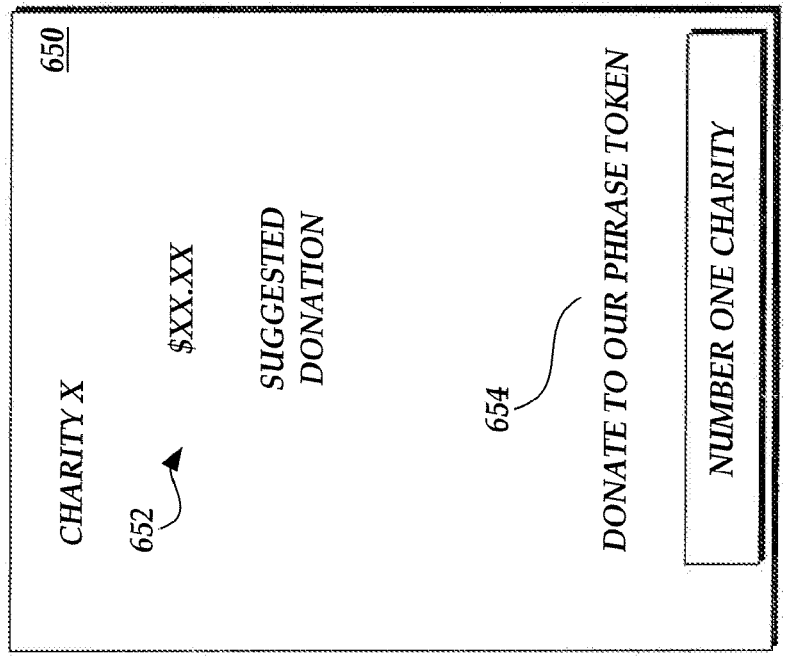
FIG. 6B is a block diagram illustrative of a screen display generated by a computing device for facilitating the publication of a transaction phrase token to complete a purchase transaction in accordance with an aspect of the present invention.
Figure 6A:
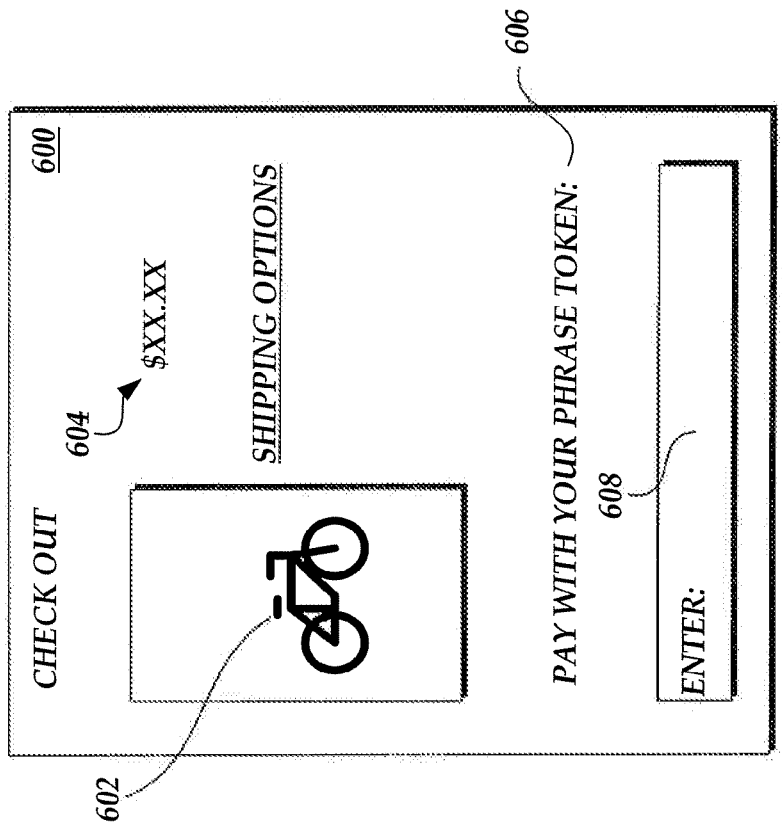
FIG. 6A is a block diagram illustrative of a screen display generated by a computing device for facilitating the submission of a transaction phrase token to complete a purchase transaction in accordance with an aspect of the present invention.

With reference now to FIG. 5, a transaction phrase token processing routine 500 will be described. At block 502, the transaction token processing component 116 of the transaction phrase token processing service 112 obtains a transaction request from a receiver 102D (FIGS. 2A-2E) that includes at least one transaction phrase token. As described above, transaction phrase tokens may be obtained in a variety of manners. In one embodiment, a transmitter 102A may submit their transaction phrase token via a Web site to facilitate debiting of the transaction account associated with the transaction phrase token. FIG. 6A is a block diagram illustrative of a screen display 600 generated by a computing device for facilitating the submission of a transaction phrase token to complete a purchase transaction. As illustrated in FIG. 6A, the screen display 600 can correspond to a typical e-commerce Web page including an identification item for purchase 602 and the various terms associated with the transaction 604, such as a vendor for the item, a price associated with the purchase of the item, shipping information, technical specifications, and the like. Additionally, the screen display 600 includes a portion 606 for submitting a transaction phrase token as a method of payment, such as via input field 608.

In another embodiment, a transmitter may submit a transaction phrase token to facilitate the crediting of the transaction account associated with the transaction phrase token. FIG. 6B is a block diagram illustrative of a screen display 650 generated by a computing device for facilitating the transmission, such as by publication, of a transaction phrase token to complete a transaction. As illustrated in FIG. 6B, the screen display 600 can correspond to a typical Web page that includes content 652 rendered on a software application browser, such as information identifying aspects of the transaction phrase token holder. In addition, the screen display 650 includes a section 654 for publishing the transaction phrase token. In the illustrative example, the transaction phrase token may correspond to a charity in which the transaction account associated with the transaction phrase token can be configured only to accept credits and cannot be debited.

Returning to FIG. 5, at decision block 504, the transaction token processing component 116 then determines whether there are any auto-processing rules associated with the offered transaction phrase tokens. If so, the transaction phrase token processing service 112 accepts or rejects the transaction based on the auto-processing rules at block 506 and the routine 500 terminates. As previously described, the auto-processing rules can correspond to the automatic rejection or acceptance of a proposed transaction based upon aspects of the transaction, such as the vendor, the item/service, and/or transaction amount. Additional or alternative processing rules may also be utilized with the transaction phrase tokens. In an illustrative embodiment, the processing of an automatic acceptance can include the transfer of funds between two transaction accounts as dictated by the terms of the transaction. Additionally, the processing of the automatic acceptance includes the transmittal of a notification/instruction to transfer control of the agreed upon element (e.g., cash, service, good, value, etc.) between the parties to the transaction. The processing of the automatic acceptance can further include the updating of information about the transmitter and the receiver indicating a successful transaction and/or any additional information provided by either party. In another embodiment, the processing of an automatic rejection can include the transmittal of notifications, the updating of transaction phrase token holder profiles, and/or collection of additional configuration information for the transaction phrase token. Additionally, the processing of the rejection can include the updating of information about the transmitter and the receiver indicating an unsuccessful transaction and/or any additional information provided by either party. In yet another embodiment, the auto-processing rules may also include the processing of a reputation score for the receiver and/or transmitter. The reputation score can correspond to a sum of values in which each previous acceptance or rejection of a transaction is associated with a value. For example, if a reputation score corresponds to positive values for approved transactions and a receiver's reputation score (e.g., corresponding to a previous transaction history) is below a threshold, the transaction may be automatically rejected.

If at decision block 506 no auto-processing rules exist, the transaction token processing component 116 then transmits an acceptance request to the transmitter 102A at block 508. As described above, there are a number of mechanisms the transaction phrase token processing service 112 may employ to transmit the request to the transmitter. At decision block 510, a test is conducted to determine whether the proffered transaction has been accepted by the transaction phrase token holder. In an illustrative embodiment, the transaction token processing component 116 determines whether a responsive communication indicative of acceptance has been received from the transaction phrase token holder. Additionally, the transaction token processing component 116 may incorporate a time component such that a transaction is automatically approved or rejected if a responsive communication has not been received from the transaction phrase token holder. If the transmitter accepts the transaction, at block 512, the transaction token processing component 116 processes the transaction acceptance. In an illustrative embodiment, the processing of the acceptance can include the transfer of funds between two transaction accounts as dictated by the terms of the transaction. Additionally, the processing of the acceptance may include the transmittal of a notification/instruction to transfer control of the agreed upon element between the parties to the transaction.

As described above, the transaction token processing component 116 may transmit notifications, update transaction phrase token holder profiles, and/or collect additional configuration information regarding the transaction phrase token. Additionally, the processing of the acceptance may include the updating of information about the transmitter and the receiver indicating a successful transaction, and/or any additional information provided by either party. For example, each transaction phrase token holder may be associated with a reputation score that is indicative of the number of previous acceptances/rejections.

Alternatively, if the transmitter rejects the transaction, at block 514, the transaction token processing component 116 can process the transaction rejection. As described above, the transaction token processing component 116 may transmit notifications, update transaction phrase token holder profiles, and/or collect additional configuration information for the transaction phrase token. Additionally, the processing of the rejection can include the updating of information about the transmitter and the receiver indicating an unsuccessful transaction and/or any additional information provided by either party. Further, the transaction token processing component 116 may initiate/facilitate additional feedback for a rejection that was not with prejudice. At block 516, the routine 500 terminates.

Figure 7A:
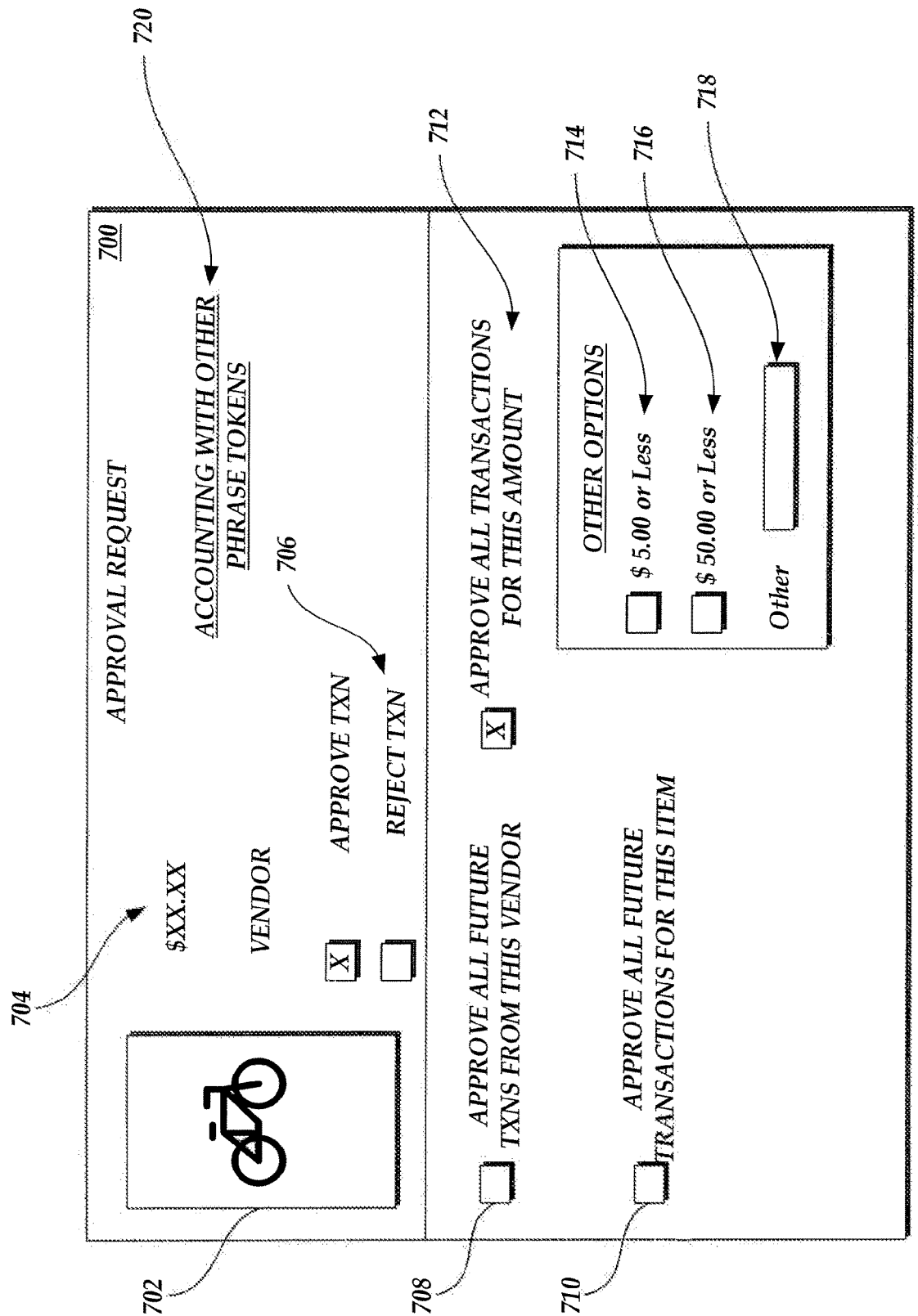
FIG. 7A is a block diagram illustrative of a screen display generated by a computing device for facilitating the acceptance of a transaction associated with a transaction phrase token and the additional configuration of the transaction phrase token in accordance with an aspect of the present invention.

As described above, in a further illustrative embodiment, transaction phrase token holders can be prompted to accept a proposed transaction when they are a transmitter 102A. Additionally, transaction phrase token holders can provide feedback to the transaction phrase token processing service 112 for further configuration of transaction phrase tokens. In one aspect, as described above, the transaction phrase token holder can submit additional configuration information for their transaction phrase token upon acceptance of a transaction. FIG. 7A is a block diagram illustrative of a screen display 700 generated by a computing device for facilitating the acceptance of a transaction corresponding to a transaction phrase token holder and the additional configuration of the transaction phrase token. As illustrated in FIG. 7A, the screen display 700 includes content identifying the requested transaction, such as a picture of the item in question 702, and additional information regarding the proposed transaction 704, such as an identification of the vendor (e.g., the purported receiver), the transaction amount, etc. Additionally, the screen display 700 includes a set of selectable controls 706 for approving or rejecting the transaction based on the provided information. In an alternative embodiment, the screen display 700 can further include additional controls for requesting additional information and/or providing feedback related to the acceptance/rejection of the transaction.

With continued reference to FIG. 7A, the screen display 700 includes a set of controls for providing additional configuration information to the transaction token processing component 116. As illustrated in FIG. 7A, the screen display 700 includes a control 708 for approving all transactions from the particular vendor (e.g., receiver), a control 710 for approving all transactions for this item, and/or a control 712 for approving all transactions for the value. In an illustrative embodiment, the screen display 700 can further include additional controls for specifying more specific, or alternative, ranges or thresholds for the configuration information, as illustrated in value threshold controls 714, 716, and 718. Additionally, the screen display 700 can include an additional embedded link 720 to request accounting information with other phrase tokens. For example, the transaction phrase token holder may wish to approve the transaction and at the same time place a request to another transaction phrase token holder for some portion of the purchase price.

Figure 7B:
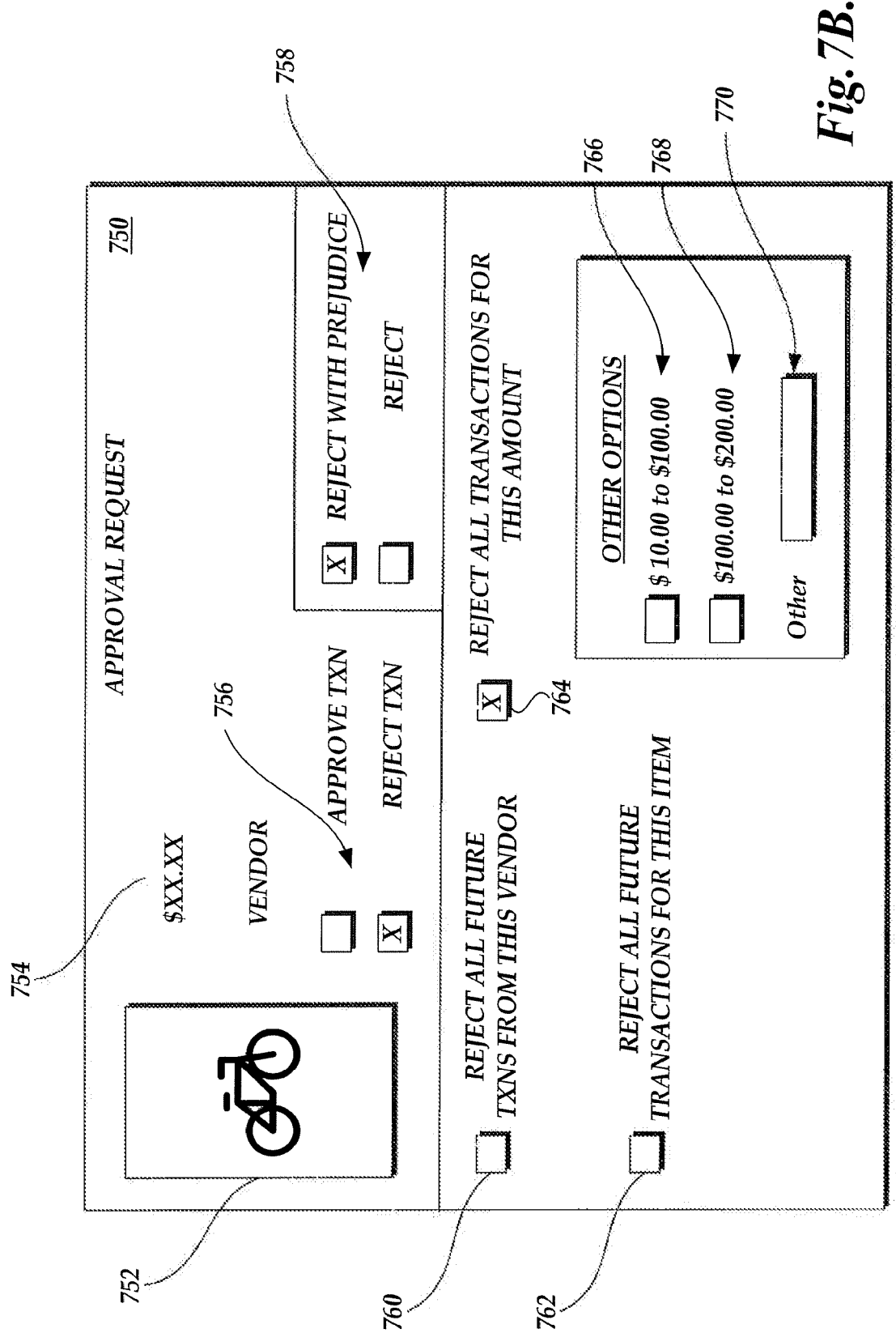
FIG. 7B is a block diagram illustrative of a screen display generated by a computing device for facilitating the rejection of a transaction associated with a transaction phrase token and the additional configuration of the transaction phrase token in accordance with an aspect of the present invention.

In another aspect, as described above, the transaction phrase token holders can be prompted to reject a proposed transaction when they are transmitted. Additionally, the transaction phrase token holders can provide feedback to the transaction token processing component 116 for further configuration of transaction phrase tokens based on the rejected transaction phrase token. FIG. 7B is a block diagram illustrative of a screen display 750 generated by a computing device for facilitating the rejection of a transaction corresponding to a transaction phrase token holder and the additional configuration of the transaction phrase token. As illustrated in FIG. 7B, similar to FIG. 7A, the screen display 750 includes content identifying the requested transaction, such as a picture of the item in question 752 and additional information regarding the proposed transaction 754, such as an identification of the vendor (e.g., the purported receiver), the transaction amount, etc. Additionally, the screen display 750 includes a set of selectable controls 756 for approving or rejecting the transaction based on the provided information. In this illustrative embodiment, the transaction phrase token holder has selected to reject the transaction. Accordingly, the transaction phrase token holder may be prompted to select whether to reject the transaction with prejudice or reject the transaction with a possibility of feedback/corrections, as described above via control 758.

With continued reference to FIG. 7B, the screen display 750 includes a set of controls for providing additional configuration information to the transaction token processing component 116. The screen display 750 includes a control 760 for rejecting all transactions from a particular vendor (e.g., receiver), a control 762 rejecting all transactions for this item, and/or a control 764 rejecting all transactions for the value. Similar to FIG. 7A, the screen display 750 can include additional controls for specifying ranges, thresholds, etc., for the configuration information, such as value thresholds 766, 768, 770, and 772. One skilled in the

19 relevant art will appreciate that additional or alternative configuration information may be provided as part of the feedback. Additionally, the transaction phrase token holder may be redirected to a more detailed transaction phrase token configuration interface, such as the interface illustrated in FIG. 4B.

While illustrative embodiments have been illustrated and described, it will be appreciated that various changes can be made therein without departing from the spirit and scope of the invention.

The invention claimed is:

1. A system for processing transactions comprising:
a token issuer server comprising one or more physical processors for assigning transaction phrase tokens to transaction phrase token holders, wherein individual transaction phrase tokens consist of a set of characters that in their entirety have a secondary meaning to a transaction phrase token holder, wherein the secondary meaning is indicative of a type of transaction for which the transaction phrase token is used, wherein the transaction phrase token is associated with a transaction account, and wherein the token issuer server is further configured to:
verify one or more words in the transaction phrase token based on presence of the one or more words in a verification source;
determine whether a pronunciation of the set of characters, when transmitted verbally, is unambiguous within a vocabulary of a language to at least a class of transaction phrase token holders;
if the pronunciation of the set of characters is determined to be unambiguous, assign the transaction phrase token to the transaction phrase token holder based at least in part on the verification of the one or more words and on the determination that the pronunciation of the set of characters is unambiguous; and
if the pronunciation of the set of characters is determined not to be unambiguous, suggest an alternative transaction phrase token for assignment to the transaction phrase token holder based at least in part on the determination that the pronunciation of the set of characters is not unambiguous; and
a token processing server comprising one or more physical processors for processing a request from a party other than the transaction phrase token holder, wherein the request corresponds to a request to complete a transaction including a verbal representation of a transaction phrase token from the transaction phrase token holder and wherein the token processing server processes the transaction request in accordance with the type of transaction for which the transaction phrase token is used and based at least partly on a configuration of the transaction phrase token;
wherein the token processing server facilitates a reconciliation of the transaction account associated with the transaction phrase token in response to a successful processing of the transaction request.

2. The system as recited in claim 1, wherein the transaction account is controlled by the transaction phrase token holder.

3. The system as recited in claim 1, wherein the transaction includes a transfer of control of an agreed upon element from a party other than the transaction phrase token holder to the transaction phrase token holder.

20

4. The system as recited in claim 3, wherein the token processing server further facilitates the transfer of control of the agreed upon element from a seller to the transaction phrase token holder.

5. The system as recited in claim 1, wherein the verification source comprises at least one of a dictionary, a black list, and a list of excluded terms.

6. The system as recited in claim 1, wherein the secondary meaning corresponds to a secondary meaning associated with an audible representation of the set of characters.

7. The system as recited in claim 1, wherein the secondary meaning corresponds to a secondary meaning associated with a publication of the set of characters.

8. The system as recited in claim 1, wherein the reconciliation of the transaction account includes a debiting of the transaction account.

9. The system as recited in claim 1, wherein the reconciliation of the transaction account includes a crediting of the transaction account.

10. The system as recited in claim 1, wherein the configuration of the transaction phrase token includes a rule associated with the type of transaction for which the transaction phrase token is used, and wherein the rule causes an approval request to be sent to the transaction phrase token holder regarding the request.

11. The system as recited in claim 10, wherein the token processing server is further operative to obtain input from the transaction phrase token holder in response to the approval request, update the rule based at least in part on the input obtained from the transaction phrase token holder, and automatically process a subsequent request to complete a transaction based at least in part on the update of the rule.

12. The system as recited in claim 1, wherein the transaction phrase token is transmitted to the token processing server via communication network software equipment.

13. A method for processing transactions comprising: as implemented by one or more computing devices configured with specific executable instructions:
obtaining, by a token processing server, a request from a party other than a transaction phrase token holder, wherein the request corresponds to a request to complete a transaction including a verbal representation of a transaction phrase token from the transaction phrase token holder, wherein the transaction phrase token is assigned to the transaction phrase token holder by a token issuer server and consists of a set of alphanumeric characters that in their entirety have a secondary meaning to the transaction phrase token holder, wherein the secondary meaning is indicative of a type of transaction for which the transaction phrase token is used, wherein the transaction phrase token is associated with a transaction account, and wherein the token issuer server is further configured to:
verify one or more words in the transaction phrase token based on presence of the one or more words in a verification source;
determine whether a pronunciation of the set of characters, when transmitted verbally, is unambiguous within a vocabulary of a language to at least a class of transaction phrase token holders;
if the pronunciation of the set of characters is determined to be unambiguous, assign the transaction phrase token to the transaction phrase token holder based at least in part on the verification of the one or more words and on the determination that the pronunciation of the set of characters is unambiguous; and if the pronunciation of the set of characters is determined not to be unambiguous, suggest an alternative transaction phrase token for assignment to the transaction phrase token holder based at least in part on the determination that the pronunciation of the set of characters is not unambiguous;

processing, by the token processing server, the transaction request in accordance with the type of transaction for which the transaction phrase token is used and based at least partly on a configuration of the transaction phrase token; and causing a reconciliation of the transaction account associated with the transaction phrase token based on a successful processing of the transaction request.

14. The method as recited in claim 13, wherein the transaction account is controlled by the transaction phrase token holder.

15. The method as recited in claim 13, wherein the transaction includes a transfer of control of an agreed upon element from a party other than the transaction phrase token holder to the transaction phrase token holder.

16. The method as recited in claim 15, wherein the transaction phrase token processing component further facilitates the transfer of control of the agreed upon element from a seller to the transaction phrase token holder.

17. The method as recited in claim 13, wherein the secondary meaning corresponds to a secondary meaning associated with a representation of the set of characters in accordance with dual tone multi-frequency.

18. The method as recited in claim 13 further comprising assigning transaction tokens to transaction token holders.

19. The method as recited in claim 13, wherein obtaining the request from a party other than a transaction token holder includes obtaining a request transmitted via a network communication software application.

20. The method as recited in claim 13, wherein processing the transaction request based on a configuration of the transaction token includes obtaining additional information in accordance with a security policy.

21. The method as recited in claim 20, wherein the additional information includes a personal identifier.

22. A system for processing transactions comprising:
a token processing server comprising one or more physical processors for processing a transaction request from a party other than a transaction phrase token holder,
wherein individual transaction phrase tokens are assigned to transaction phrase token holders by a token issuer server comprising one or more physical processors, wherein a transaction phrase token consists of a set of characters that in their entirety have a secondary meaning to the transaction phrase token holder, wherein the secondary meaning is indicative of a type of transaction for which the transaction phrase token is used, wherein the transaction phrase token is associated with a transaction account, and wherein the token issuer server is further configured to:

verify one or more words in the transaction phrase token based on presence of the one or more words in a verification source;

determine whether a pronunciation of the set of characters, when transmitted verbally, is unambiguous within a vocabulary of a language to at least a class of transaction phrase token holders;

if the pronunciation of the set of characters is determined to be unambiguous, assign the transaction phrase token to the transaction phrase token holder based at least in part on the verification of the one or more words and on the determination that the pronunciation of the set of characters is unambiguous; and if the pronunciation of the set of characters is determined not to be unambiguous, suggest an alternative transaction phrase token for assignment to the transaction phrase token holder based at least in part on the determination that the pronunciation of the set of characters is not unambiguous;

wherein the request corresponds to a request to complete a transaction including a verbal representation of the transaction phrase token from the transaction phrase token holder, wherein the token processing server processes the transaction request in accordance with the type of transaction for which the transaction phrase token is used and based at least partly on a configuration of the transaction phrase token; and wherein the token processing server facilitates a reconciliation of the transaction account associated with the transaction phrase token upon a successful processing of the transaction request.

23. The system as recited in claim 22, wherein the transaction includes a transfer of control of an agreed upon element from a party other than the transaction phrase token holder to the transaction phrase token holder.

24. The system as recited in claim 22, wherein the token processing server further facilitates the transfer of control of the agreed upon element from a seller to the transaction phrase token holder.

25. The system as recited in claim 22, wherein the set of characters corresponds to a set of alphanumeric characters.

26. The system as recited in claim 22, wherein the secondary meaning corresponds to a secondary meaning associated with a publication of the set of characters.

27. The system as recited in claim 22, wherein the reconciliation of the transaction account includes at least one of a debiting or a crediting of the transaction account.

28. The system as recited in claim 22, wherein the token processing server is further operative to implement a security policy associated with the processing of the request.

29. The system as recited in claim 28, wherein the security policy corresponds to transmission of a personal identifier by the transaction phrase token holder.

* * * * *